(12) United States Patent
Radakovitz et al.

(10) Patent No.: US 11,157,691 B2
(45) Date of Patent: Oct. 26, 2021

(54) NATURAL QUICK FUNCTION GESTURES

(71) Applicant: Microsoft Technology Licensing, LLC, Redmond, WA (US)

(72) Inventors: Sam C. Radakovitz, Puyallup, WA (US); John Campbell, Renton, WA (US); Carlos Augusto Otero, Seattle, WA (US); Allison Jane Rutherford, Seattle, WA (US); Uhl Albert, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/833,098

(22) Filed: Mar. 27, 2020

(65) Prior Publication Data

US 2020/0285806 A1    Sep. 10, 2020

Related U.S. Application Data

(63) Continuation of application No. 13/918,871, filed on Jun. 14, 2013, now abandoned.

(51) Int. Cl.
*G06F 17/00*    (2019.01)
*G06F 40/18*    (2020.01)
*G06F 3/0488*   (2013.01)

(52) U.S. Cl.
CPC .......... *G06F 40/18* (2020.01); *G06F 3/04883* (2013.01)

(58) Field of Classification Search
CPC .... G06F 40/18; G06F 3/04883; G06F 3/0486; G06F 3/0482; G06F 16/972; G06F 3/04815; G06F 3/0487; G06F 3/0488; G06F 2203/04105; G06F 40/177; G06Q 40/06; G06Q 40/025; G06Q 40/00
(Continued)

(56) References Cited

U.S. PATENT DOCUMENTS 8,817,053 B2   8/2014 Robert et al.
10,180,714 B1   1/2019 Kin et al.
(Continued)

FOREIGN PATENT DOCUMENTS

CN    1904879 A    1/2007
CN    101371255 A   2/2009
(Continued)

OTHER PUBLICATIONS

"Remote Control for Zoomable UI on TV", In Prior Art Database Technical Disclosure, IPCOM000159392D, Oct. 29, 2007, 6 Pages.
(Continued)

*Primary Examiner* — Jason T Edwards
(74) *Attorney, Agent, or Firm* — Merchant & Gould P.C.

(57) ABSTRACT

Natural gestures for interacting with spreadsheet documents are provided. A user may interact with a spreadsheet document using a variety of touch-based gestures. Gestures applied to a spreadsheet document may be used for making structural and display changes to the document. For example, gestures may be used on the spreadsheet document for inserting new columns and rows; for revealing hidden columns and rows; for deleting columns and rows; for extending functionalities across columns and rows; for moving objects displayed in a spreadsheet document; and for navigating various parts of a spreadsheet document.

20 Claims, 22 Drawing Sheets

(58) Field of Classification Search
USPC ........................................................ 715/220
See application file for complete search history.

(56) References Cited

U.S. PATENT DOCUMENTS

| | | | |
|---|---|---|---|
| 2003/0009411 A1* | 1/2003 | Ram | G06Q 40/04 705/37 |
| 2005/0044495 A1 | 2/2005 | Lee et al. | |
| 2008/0122796 A1* | 5/2008 | Jobs | H04M 1/72522 345/173 |
| 2008/0270886 A1* | 10/2008 | Gossweiler | H04N 21/482 715/227 |
| 2010/0031167 A1* | 2/2010 | Roytman | G06F 16/972 715/760 |
| 2010/0229090 A1 | 9/2010 | Newton et al. | |
| 2010/0306702 A1 | 12/2010 | Warner | |
| 2011/0163968 A1* | 7/2011 | Hogan | G06F 3/0488 345/173 |
| 2011/0164058 A1 | 7/2011 | Lemay | |
| 2012/0011195 A1 | 1/2012 | Prish | |
| 2012/0013539 A1* | 1/2012 | Hogan | G06F 40/177 345/173 |
| 2012/0013540 A1* | 1/2012 | Hogan | G06F 40/177 345/173 |
| 2013/0212470 A1* | 8/2013 | Karunamuni | G06F 3/04842 715/243 |
| 2013/0212541 A1 | 8/2013 | Dolenc et al. | |
| 2014/0208271 A1* | 7/2014 | Bell | G06F 3/0487 715/836 |
| 2014/0282242 A1* | 9/2014 | Denoue | G06F 3/017 715/810 |
| 2015/0161095 A1* | 6/2015 | Wang | G06F 40/18 715/212 |

FOREIGN PATENT DOCUMENTS

| | | |
|---|---|---|
| CN | 101882108 A | 11/2010 |
| KR | 20060046307 A | 5/2006 |
| KR | 20170037957 A | 4/2017 |

OTHER PUBLICATIONS

Kelly, et al., "Visualization Exploration and Encapsulation via a Spreadsheet-like Interface", In Journal of IEEE Transactions on Visualization and Computer Graphics, vol. 7, Issue 3, Jul. 2001, pp. 275-287.

"Notice of Allowance Issued in U.S. Appl. No. 15/637,788", dated Feb. 18, 2020, 10 Pages.

"Notice of Allowance Issued in Korean Patent Application No. 10-2014-7025384", dated Jan. 6, 2020, 5 Pages.

"Office Action and Search Report Issued in Chinese Patent Application No. 201710255434.X", dated Feb. 3, 2020, 9 Pages.

"Office Action Issued in Brazil Patent Application No. BR112015031195.4", dated Feb. 18, 2020, 5 Pages.

"Summons to Attend Oral Proceedings Issued in European Patent Application No. 13741052.8", dated Apr. 22, 2020, 7 Pages.

"Office Action Issued in Indian Patent Application No. 7676/CHENP/2015", dated Jul. 3, 2020, 8 Pages.

"Office Action Issued in Korean Patent Application No. 10-2015-7035530.", dated Dec. 28, 2020, 16 Pages.

"Notice of Allowance Issued in Korean Patent Application No. 10-2015-7035530", dated Jun. 15, 2021, 14 Pages.

"Office ction Issued in European Patent Application No. 14736166.1", dated Aug. 10, 2021, 9 Pages.

* cited by examiner

MOBILE COMPUTING DEVICE

NATURAL QUICK FUNCTION GESTURES

CROSS-REFERENCE TO RELATED APPLICATIONS

This application is a continuation application of U.S. patent application Ser. No. 13/918,871, entitled "NATURAL QUICK FUNCTIONS GESTURES," filed on Jun. 14, 2013, the entire disclosure of which is hereby incorporated herein by reference.

BACKGROUND

With the advent of spreadsheet applications, computer and computer software users have become accustomed to processing and manipulating enormous amounts of data and using spreadsheet functions to perform many simple to very complex calculations and organizational functions with their data. Typical spreadsheet solutions provide a grid made up of rows and columns for receiving and manipulating data. Generally, users interact with spreadsheets through input devices, such as mice, touchscreens, motion-detection devices, graphical user interfaces, and keyboards. Sometimes this interaction can be frustrating. For example, when utilizing a spreadsheet application on a touch device, the user interface (UI) may be designed as a mouse-focused UI. Selection of and interaction with data and functionality controls via touch may be the same as or similar to selection and interaction via a mouse, wherein differences, in some cases, may include providing larger functionality controls for touch input, or that a user's finger is used instead of a mouse cursor.

Oftentimes, it is believed that touch or motion-sensing devices may not be suited for productivity work, and may be more suited for consumption of data. Current UI interactions with a spreadsheet application on touch or motion-sensing devices may not take advantage of using natural gestures to interact with the application. Thus, an improvement and technical advantage will be gained by providing a variety of natural gestures for interacting with an application user interface, such as a spreadsheet application user interface and associated documents.

It is with respect to these and other considerations that the present invention has been made. Although relatively specific problems have been discussed, it should be understood that the embodiments disclosed herein should not be limited to solving the specific problems identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Embodiments of the present invention solve the above and other problems by providing natural gestures for interacting with spreadsheet documents. According to embodiments, a user may interact with a spreadsheet document using a variety of touch-based gestures. Gestures applied to a spreadsheet document may be used for making structural and display changes to the document. For example, gestures may be used on the spreadsheet document for inserting new columns and rows; for revealing hidden columns and rows; for deleting columns and rows; for extending functionalities across columns and rows; for moving objects displayed in a spreadsheet document; and for navigating various parts of a spreadsheet document.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

FIGS. 9A-9C illustrate a multi-finger swipe gesture;

DETAILED DESCRIPTION

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. Embodiments may be practiced as methods, systems, or devices. Accordingly, embodiments may take the form of a hardware implementation, an entirely software implementation or an implementation combining software and hardware aspects. The following detailed description is, therefore, not to be taken in a limiting sense.

Figure 1:
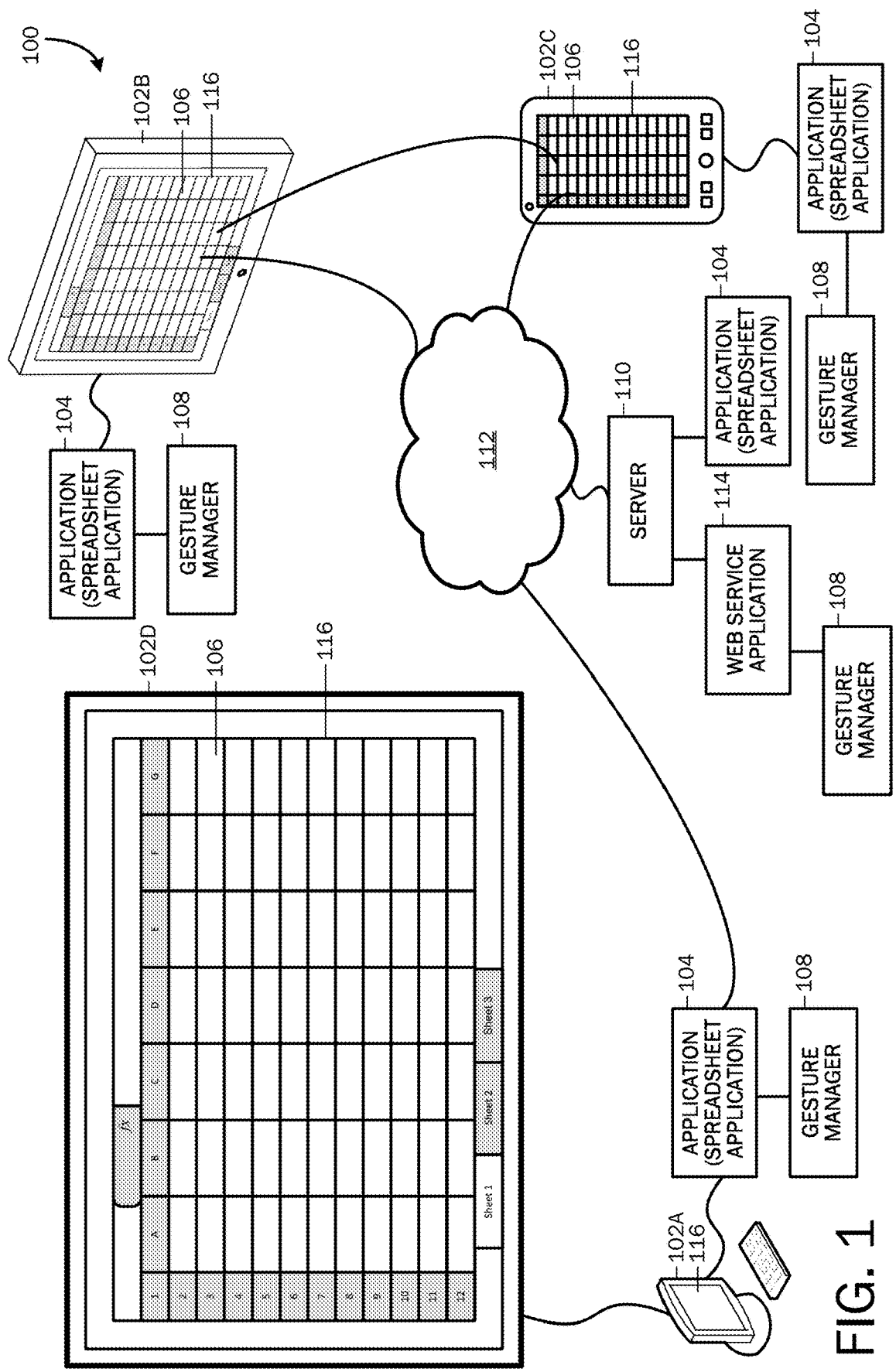
FIG. 1 illustrates a system architecture in which embodiments of the present invention may be practiced.

Embodiments of natural quick function gestures are described herein and are illustrated in the accompanying figures. Natural quick function gestures may be provided in the context of an application on any device, service, or general endpoint capable of running the application. FIG. 1 illustrates a system architecture in which embodiments of the present invention may be practiced. The system 100 includes one or more computing devices such as a personal computer (e.g., a desktop or laptop computer) 102A, a tablet computer 102B, a smart phone 102C, and a large-scale display 102D. Each of the computing devices 102 may run an application 104 for displaying and editing data. As illustrated in FIG. 1, an application 104 may include a spreadsheet application for displaying and editing a spreadsheet 106. As should be appreciated, the computing devices 102 are for purposes of illustration only and are not exhaustive of the various types of computing devices that may be used in accordance with embodiments of the present invention. For example, while the large-scale display 102D is illustrated as a display unit with an associated computing device 102A, the large-form display device 102D may operate as an integrated display/computing device that may be used for any suitable use from large-scale display uses, for example, in a conference room, to personal computing, as desired.

According to embodiments, each of the computing devices 102 illustrated in FIG. 1 may receive input through a variety of suitable means including touch or gesture input, keyboard input, mouse input, voice command input, electronic inking input, and the like. According to one embodiment, each computing device 102 may comprise an operating system configured to include support for touch and gesture input. According to another embodiment, a gesture manager 108 illustrated in association with each of the computing devices and which will be described in greater detail below, may be utilized to process some/all of the touch and gesture input that is received from touch and gesture input.

Referring still to FIG. 1, the applications 104 illustrated in association with each of the computing devices 102 are illustrative of applications 104 having sufficient computer executable instructions for enabling embodiments of the present invention as described herein. An example application 104 includes a spreadsheet application, such as Excel® manufactured by Microsoft Corporation of Redmond, Wash. As should be appreciated, this is but one example spreadsheet application, and any other applications 104 suitable for enabling embodiments described herein may be used.

According to embodiments, application functionality associated with each of the computing devices 102 may operate according to one or more variations. For example, each application 104 may be a fully functional "thick" client application having all application functionality including the ability to send and receive data to and from other applications 102 operating on other computing devices in the collaborative work session. According to another embodiment, the computing devices 102 may communicate via a distributed computing network 112, for example, the Internet. An Internet-based or "cloud-based" server computer 110 may be operated on one or more web services applications 114 for providing a collaborative work session. According to this embodiment, each of the devices 102 may operate as thin client systems, and collaborative communication between the devices may be operated at the direction of the web services application 114 operated at a remote site. According to this embodiment, an application 104 may operate at the remote server 110 wherein each of the devices 102 may access and receive the functionality described herein via a remote service from the server based application, for example, via the web services application 114.

As illustrated in FIG. 1, the system 100 may comprise a gesture manager 108 configured to detect gestures that are received by a computing device 102. Generally, a gesture manager 108 may be configured to sense when a gesture is received that is related to performing an operation in conjunction with an application program 104, such as a spreadsheet application. A gesture may include user interaction with data displayed on or functionalities associated with a computing device 102, wherein the user interaction may originate from a bodily movement (e.g., movement of one or more fingers, hands, arms, etc.). A gesture may include bodily contact with a touch input device (e.g., a touchscreen 116), or may include bodily movement detected by a sensor, such as a camera, an accelerometer, a motion detector, etc. A touch input device may be operable to recognize a presence of two or more points of contact on a sensing surface, sometimes referred to as multi-touch input. A gesture may include user interaction with a touchscreen 116 using bodily movements to manipulate data and/or to select functionalities, for example, data displayed in and functionalities associated with an application 104, such as a spreadsheet application. As used herein, the term "gesture" includes touch input. As can be appreciated, gesturing may enable users to communicate with a computing device 102 and interact naturally. Different types of gestures may be received. For example, a tapping gesture, a pulling gesture, a dragging gesture, a pushing gesture, a throwing gesture, panning gesture, a tearing gesture, a pinch-and-turn gesture, and the like may be received. The gestures may be used to change a display of information, activate/deactivate functions, and/or perform some other type of operation associated with an application 104 or some other function and/or program. Additional details regarding the gestures will be provided below.

Figure 2:
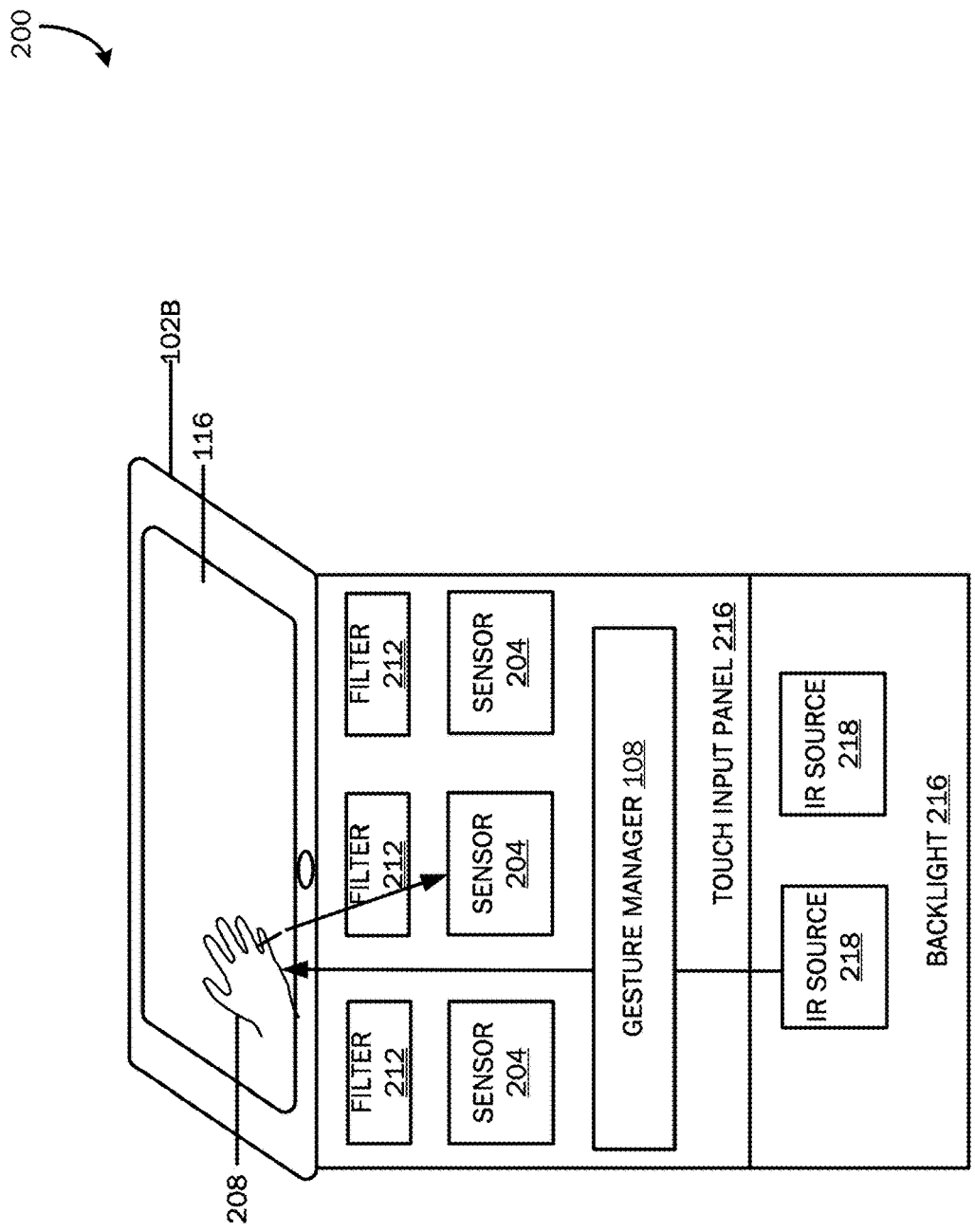
FIG. 2 illustrates a touch input system in which embodiments of the present invention may be practiced.

FIG. 2 illustrates an exemplary touch input system 200. The touch input system 200 as illustrated comprises a touch panel 216 that comprises several sensors 204 integrated therein. According to one embodiment, the sensors 204 are Infrared (IR) sensors. The touch input system 200 is configured to detect objects that either in contact with a touchable surface 116 or are close to but not in actual contact with ("adjacent") touchable surface 116. The objects that are sensed may be many different types of objects such as finger, hands, or other physical objects. Infrared sensors 204 are distributed throughout touch panel 216 and are arranged parallel to touchable surface 116. One or more of the infrared sensors 204 may detect infrared radiation reflected from objects, such as hand 208, as indicated by the arrow. Although the term "above" is used in this description, it should be understood that the orientation of the touch panel system is irrelevant. As shown in FIG. 2, the touchable surface 116 is horizontal, but in a different embodiment generated by rotating system 200 clockwise by 90 degrees, the touchable surface 116 could be vertical. In that embodiment, the objects from which reflected IR radiation is detected are to the side of touchable surface 116. The term "above" is intended to be applicable to all such orientations. The touchable surface 116 may also be changed to other orientations.

The touch panel 216 may comprise filters 212 that absorb visible light and transmit infrared radiation and are located between touchable surface 116 and IR sensors 204 in order to shield IR sensors 204 from visible light incident on touchable surface 116 in the case where IR sensors 204 are sensitive to a broader range of wavelengths of light other than purely infrared wavelengths.

The touch panel 216 may comprise a display that is configured to display images that are viewable via the touchable surface 116. For example, the displayed image may be images relating to an application 104, such as a spreadsheet 106. The display may be, for example, an LCD, an organic light emitting diode (OLED) display, a flexible display such as electronic paper, or any other suitable display in which an IR sensor can be integrated.

The system 200 may comprise a backlight 216 for the display. The backlight 216 may comprise at least one IR source 218 that is configured to illuminate objects in contact with or adjacent to the touchable surface 116 with infrared radiation through the touchable surface 116, as indicated by the arrows. IR sensors 204 are sensitive to radiation incident from above, so IR radiation traveling directly from the backlight 216 to the IR sensors 204 is not detected.

The output of sensors 204 may be processed by the gesture manager 108 and/or functionality included within an operating system or some other application to detect when a physical object (e.g., a hand, a finger, a stylus, etc.) has come into physical contact with a portion of the touch input surface 116 and/or a physical object is in close proximity to the surface. For example, sensors 204 can detect when a portion of a user's hand 208, such as one or more fingers, has come in contact with or is near to the touch input display surface 116. Additional sensors can be embedded in the touch input display surface 116 and can include for example, accelerometers, pressure sensors, temperature sensors, image scanners, barcode scanners, etc., to detect multiple simultaneous inputs.

When the sensors 204 are IR sensors, the IR radiation reflected from the objects may be reflected from a user's hands, fingers, reflective ink patterns on the objects, metal designs on the objects or any other suitable reflector. Fingers reflect enough of the near IR to detect that a finger or hand 208 is located at a particular location on or adjacent the touchable surface 116. A higher resolution of IR sensors may be used to scan objects in order to achieve higher resolution.

Sensors 204 can be included (e.g., embedded) in a plurality of locations. The density of sensors 204 can be sufficient such that contact across the entirety of the touch input surface 116 can be detected. Sensors 204 may be configured to sample the surface of touch input display surface 206 at specified intervals, such as, for example, 1 ms, 5 ms, etc. for detected contact and/or near contact. The sensor data received from sensors 204 changes between sampling intervals as detected objects move on the touch surface; detected objects are no longer within range of detection; and when new objects come in range of detection. For example, the gesture manager 108 can determine that contact was first detected at a first location and then contact was subsequently moved to other locations. In response, the gesture manager 108 may determine when a gesture is received and what type of gesture is received.

FIG. 2 provides just one example of a touch input system. In other exemplary touch systems, the backlight may not comprise any IR sources and the surface 116 may include a frontlight which comprises at least one IR source. In such an example, the touchable surface 116 of the system is a surface of the frontlight. The frontlight may comprise a light guide, so that IR radiation emitted from IR source travels through the light guide and is directed towards touchable surface and any objects in contact with or adjacent to it. In other touch panel systems, both the backlight and frontlight may comprise IR sources. In yet other touch panel systems, there is no backlight and the frontlight comprises both IR sources and visible light sources. In further examples, the system may not comprise a frontlight or a backlight, but instead the IR sources may be integrated within the touch panel. In an implementation, the touch input system 200 may comprise an OLED display which comprises IR OLED emitters and IR-sensitive organic photosensors (which may comprise reverse-biased OLEDs). In some touch systems, a display may not be included. Even if the touch system 200 comprises one or more components or elements of a display, the touch system may be configured to not display images. For example, this may be the case when the touch input device is separate from a display. Other examples include a touchpad, a gesture pad, and similar non-display devices and components.

For some applications, it may be desirable to detect an object only if it is in actual contact with the touchable surface 116 of the touch panel system 200. For example, according to one embodiment, a gesture may not be recognized when the gesture is not performed touching the surface 116. Similarly, a gesture may be recognized when performed above the surface 116. The IR source of the touch input system may be turned on only if the touchable surface 116 is touched. Alternatively, the IR source may be turned on regardless of whether the touchable surface 116 is touched, and detection of whether actual contact between the touchable surface 116 and the object occurred is processed along with the output of the IR sensor. Actual contact between the touchable surface 116 and the object may be detected by any suitable means, including, for example, by a vibration sensor or microphone coupled to the touch panel 216. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

The gesture manager 108 may be configured to recognize many different types of gestures. Some of the gestures may be context dependent, be specific to an application 104, and/or be used within many different types of applications 104. For example, gestures may be used to interact with a spreadsheet 106 that is associated with a spreadsheet application. Gestures may be received in many different locations relating to touch input device/display 116. For example, a gesture may be received within a display of spreadsheet, within a gesture box, and/or at some other location on a display. Exemplary gestures and interactions with a spreadsheet are described below.

As illustrated and described with reference to FIGS. 3-14 below, gestures may be used in association with spreadsheet documents for manipulating information contained in spreadsheet documents and navigating spreadsheet documents, but also, gestures may be used for making structural and display changes to spreadsheet documents. As described below, gestures may be used for adding, deleting and moving columns and rows; for revealing or hiding columns and rows; for applying spreadsheet functionality; and for moving spreadsheet objects. As should be understood, these are but a few examples of some of the uses of gestures applied to spreadsheet documents as will be more fully described below.

Figure 3A:
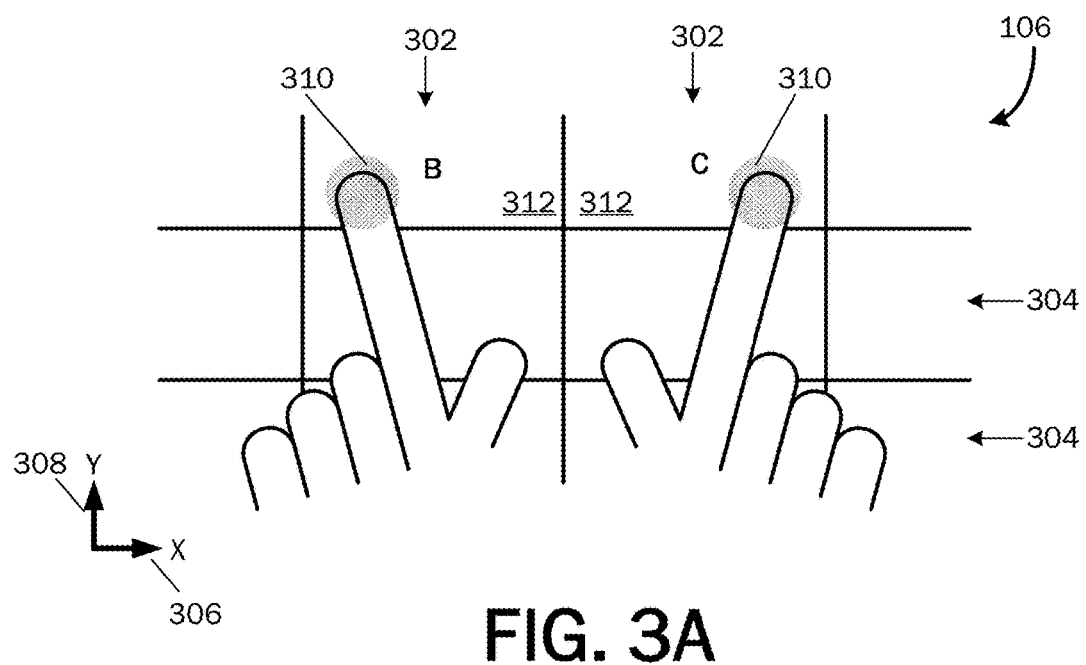
FIGS. 3A-3D illustrate a pulling-apart gesture.
Figure 3B:
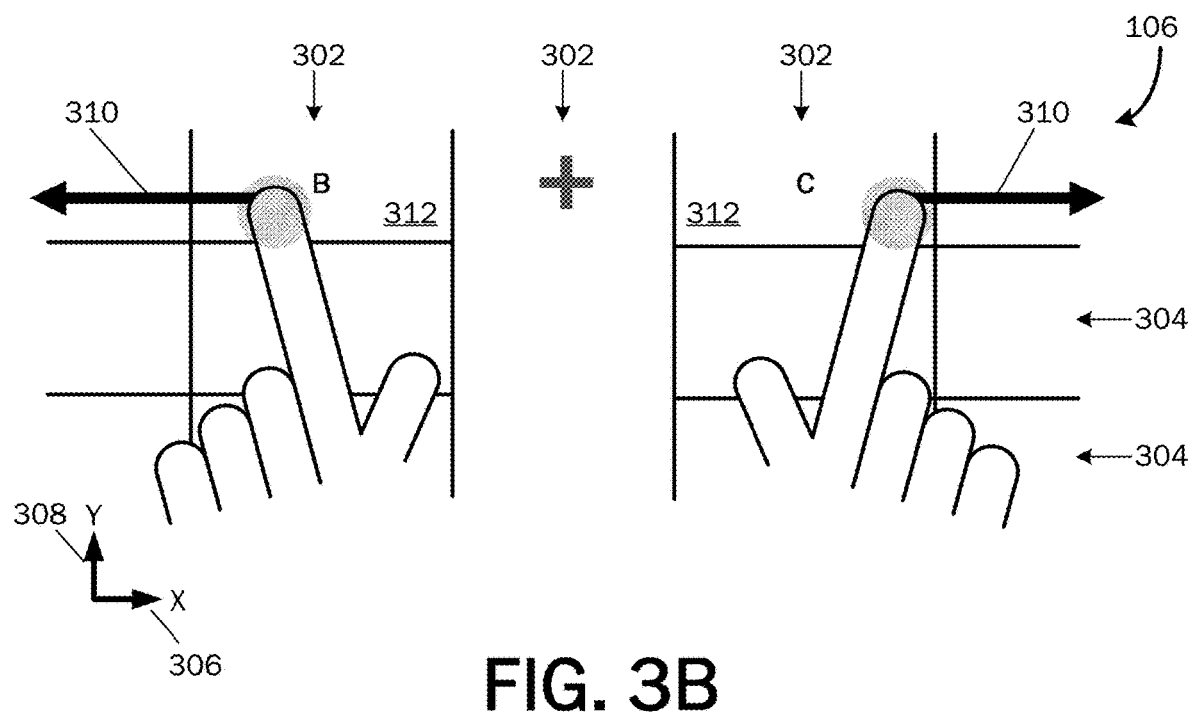

FIGS. 3A and 3B show a pull-apart gesture to insert one or more columns within a spreadsheet 106. As illustrated, FIG. 3A shows a spreadsheet 106 before pulling apart columns 302 to insert one or more columns 302, and FIG. 3B shows the same spreadsheet 106 while performing a column insertion operation via a pull-apart gesture 310.

According to an embodiment, a pull-apart gesture 310 may be detected when a user touches a touchscreen 116 with two of his fingers and pulls them apart as indicated by gesture 310. To perform a column insertion operation via the pull-apart gesture 310, the user may select a first column 302 in a spreadsheet 106, for example, by touching a column header 312 associated with the first column 302; select an adjacent column 302, for example, by touching the column header 312 associated with the adjacent column 302; and may utilize the pull-apart gesture 310 along an X-axis 306 to insert a column 302 between the first and second columns 302. Depending on how far apart the user moves his fingers, one or more columns 302 may be inserted.

According to an embodiment, one or more rows 304 may be inserted into a spreadsheet 106 via selecting adjacent rows 304, and utilizing the pull-apart gesture 310 along a Y-axis 308. Depending on how far apart the user moves his fingers, one or more rows 304 may be inserted. A live preview of the column/row insertion operation may be displayed such that the user may be able to determine a number of columns 302 or rows 304 that will be inserted upon releasing the touch.

Figure 3C:
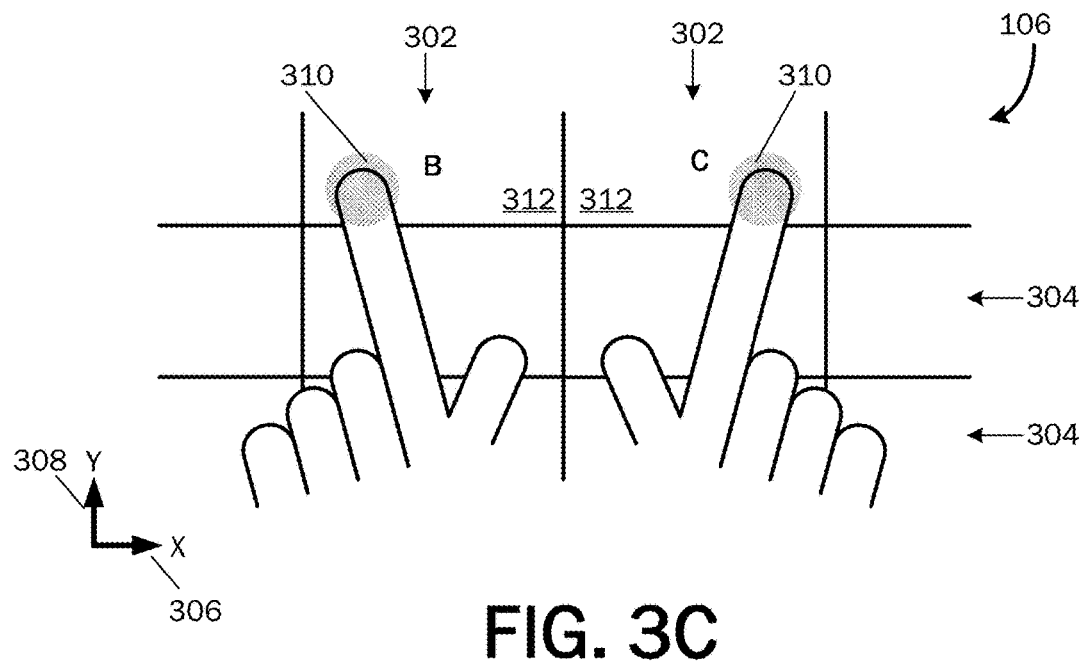
Figure 3D:
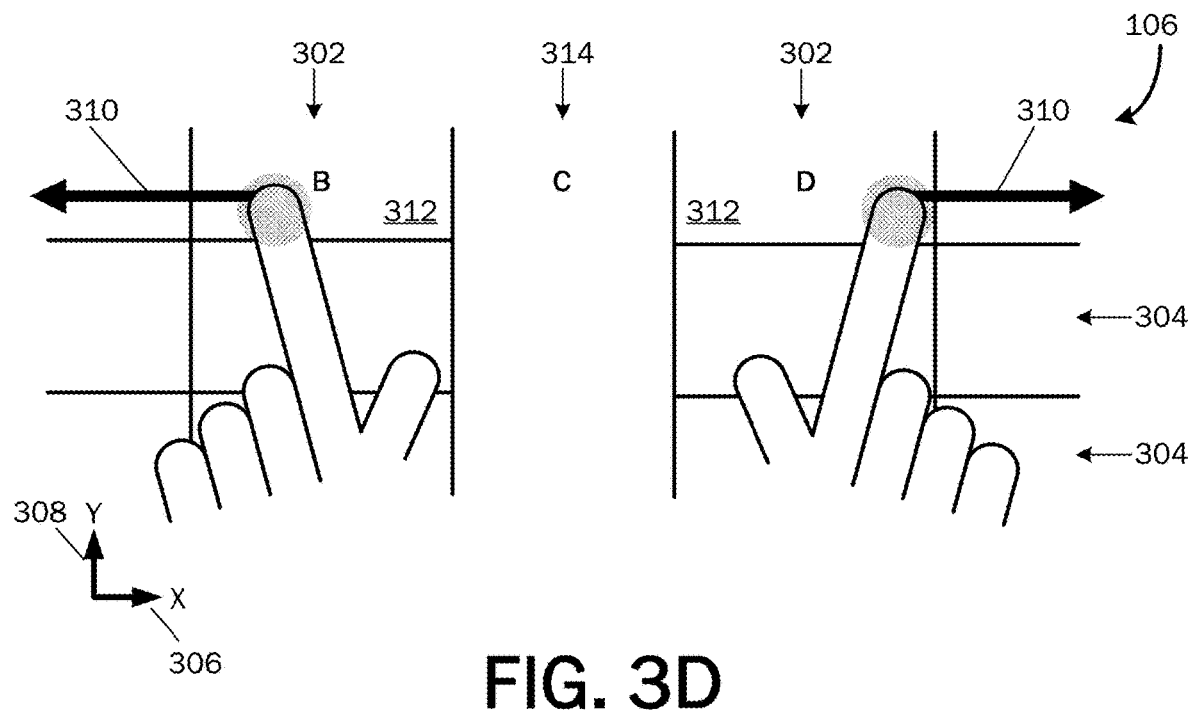

According to another embodiment, and as illustrated in FIGS. 3C and 3D, the pull-apart gesture 310 may be utilized to perform a column or row revelation operation, for example, when a column 302 or row 304 may be hidden between two columns 302 or rows 304. To perform a hidden column revelation operation via the pull-apart gesture 310, the user may select a first column 302 in a spreadsheet 106, for example, by touching a column header 312 associated with the first column 302; select an adjacent column 302, for example, by touching the column header 312 associated with the adjacent column 302; and may utilize the pull-apart gesture 310 along an X-axis 306 to reveal one or more hidden column 314 between the first and second columns 302.

According to an embodiment, one or more hidden rows may be revealed into a spreadsheet 106 via selecting adjacent rows 304, and utilizing the pull-apart gesture 310 along a Y-axis 308. Depending on how far apart the user moves his fingers and depending on how many rows 304 may be hidden, one or more rows 304 may be revealed. A live preview of the column/row revelation operation may be displayed such that the user may be able to determine how far apart to move the columns 302 or rows 304 to reveal the desired hidden column(s) 314 or rows.

Figure 4A:
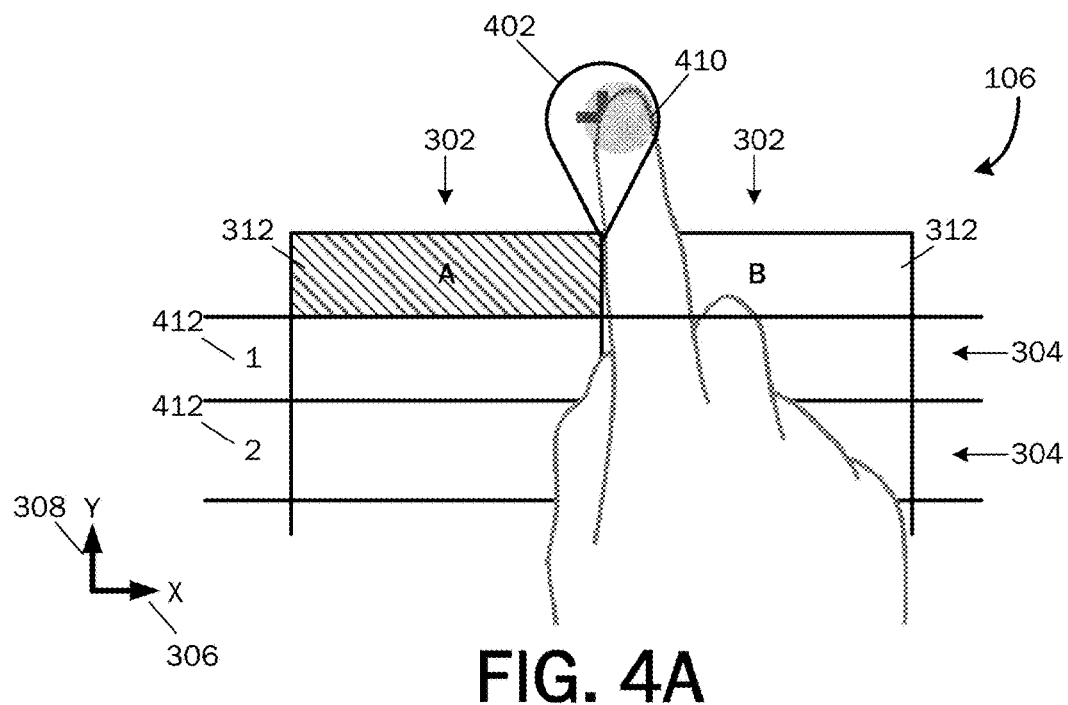
FIGS. 4A-4B illustrate a touch-and-slide gesture.
Figure 4B:
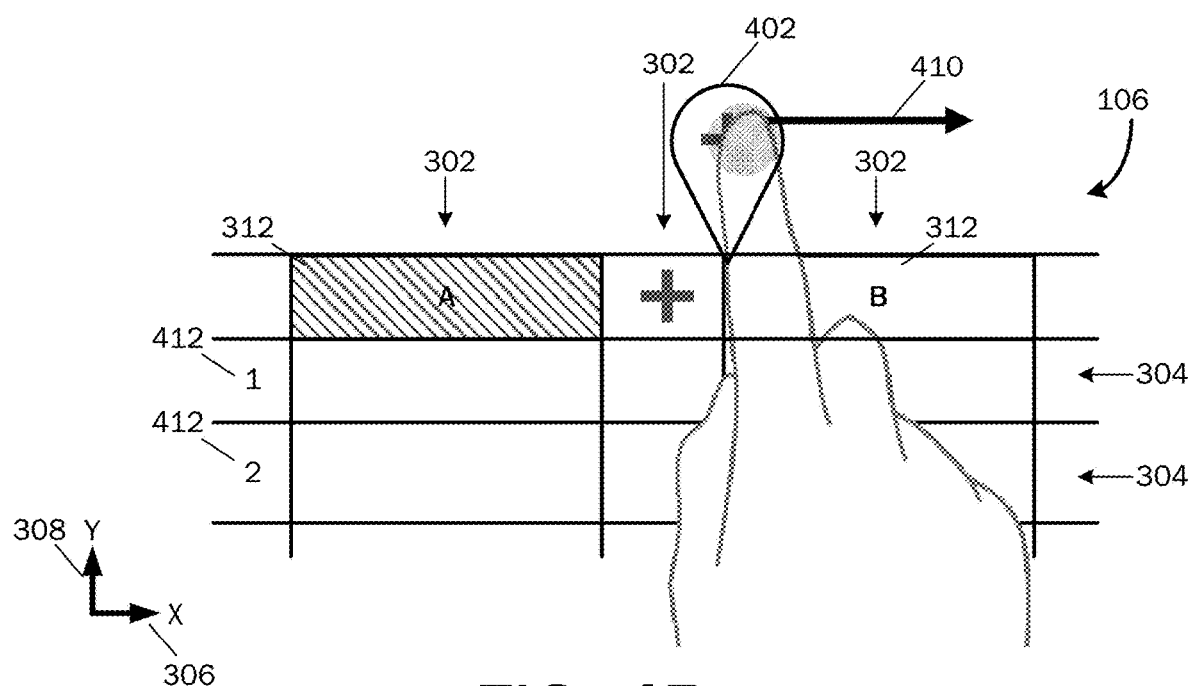

FIGS. 4A and 4B show a touch-and-slide gesture to insert one or more columns 302 within a spreadsheet 106. FIG. 4A shows a spreadsheet 106 before one or more columns 302 are inserted via a touch-and-slide gesture 410, and FIG. 4B shows the same spreadsheet 106 while performing a column insertion operation via a touch-and-slide gesture 410. According to an embodiment, a tap-and-slide gesture 410 may be detected when a user touches a touchscreen 116 on a displayed selectable UI control, such as an insert widget 402, with a finger, and slides the insert widget 402 as indicated by gesture 410. The selectable UI control (e.g., insert widget 402) may be displayed between adjoining columns 302. The selectable UI control (e.g., insert widget 402) may be displayed upon receiving an indication of a selection of a column 302. For example, a user may select a column 302 via touching a column header 312, and accordingly, an insert widget 402 may be displayed between the selected column 302 and an adjacent column 302. The user may select the insert widget 402 (e.g., via touching the widget), and then slide the insert widget 402 (i.e., touch-and-slide gesture 410) along the X-axis 306 to insert a column 302. Depending on how far the user slides the widget 402, one or more columns 302 may be inserted.

According to an embodiment, one or more rows 304 may be inserted into a spreadsheet 106 via selecting a row header 412, and utilizing the touch-and-slide gesture 410 to select and slide a displayed selectable UI control (e.g., insert widget 402) along the Y-axis 308. Depending on how far the user slides his finger, one or more rows 304 may be inserted. A live preview of the column/row insertion operation may be displayed such that the user may be able to determine a number of columns 302 or rows 304 that will be inserted upon releasing the touch.

Figure 5A:
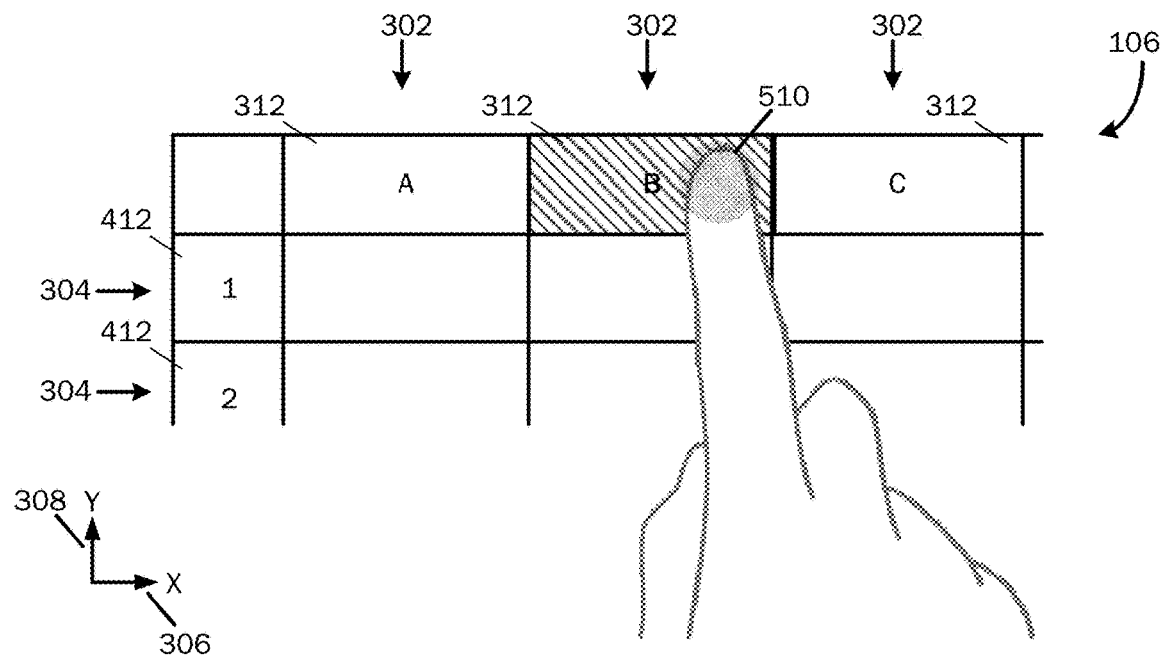
FIGS. 5A-5B illustrate a drag-and-drop gesture.
Figure 5B:
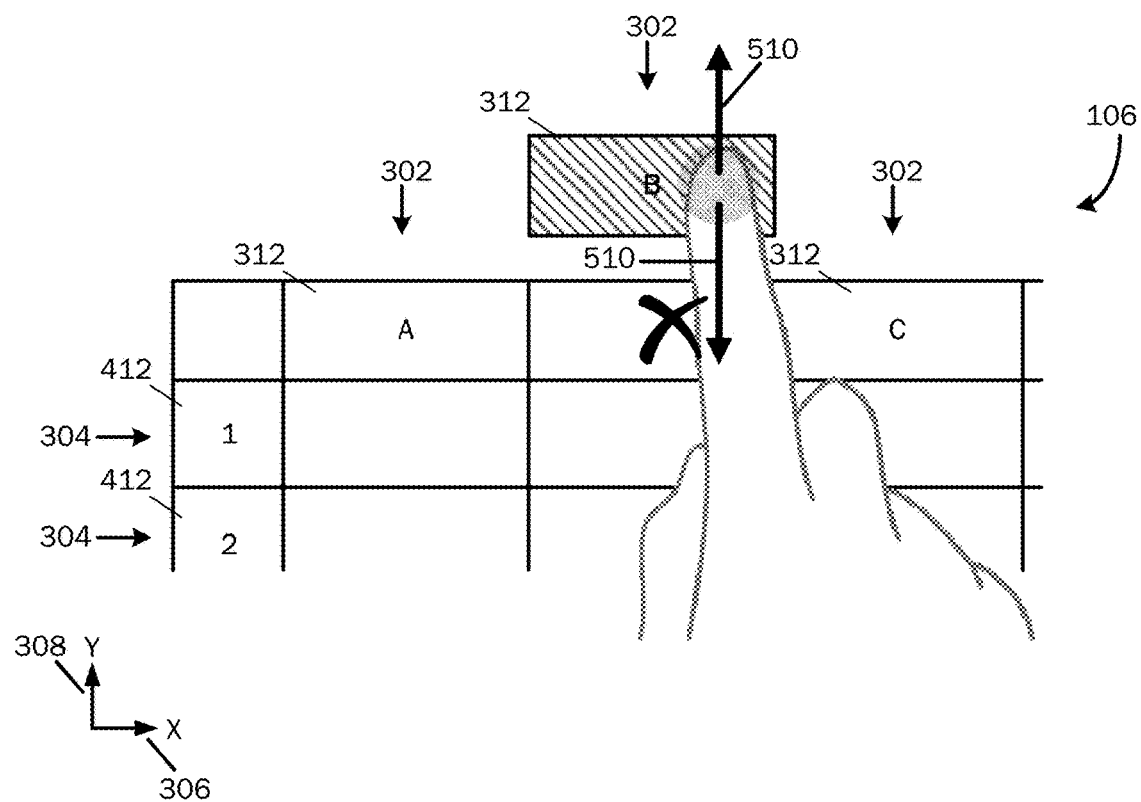

FIGS. 5A and 5B show a drag-and-drop away gesture to delete a column 302 within a spreadsheet 106. FIG. 5A shows a spreadsheet 106 before a column 302 is deleted via a drag-and-drop away gesture 510, and FIG. 5B shows the same spreadsheet 106 while performing a column deletion operation via a drag-and-drop away gesture 510. According to an embodiment, a drag-and-drop away gesture 510 may be detected when a user selects a column 302, for example, by touching a touchscreen 116 on an associated column header 312 with a finger, and drags the column header 312 in an upwards or downwards direction and away from the spreadsheet 106 as indicated by gesture 510. When the user releases the column header 312 when it has been dragged away from the other column headers 312, the associated column 302 may be deleted.

According to an embodiment, one or more rows 304 may be deleted from a spreadsheet 106 via selecting a row 304, for example, by the user selecting a row header 412 of a row he wishes to delete, and utilizing the drag-and-drop away gesture 510 to drag the row header 412 leftwards (in a left-to-right reading scenario) and away from the other row headers 412. When the user releases the row header 412 when it has been dragged away from the other row headers 412, the associated row 304 may be deleted. A live preview of the column/row deletion operation may be displayed such that the user may be able to determine how far he needs to drag the column header 312 or row header 412 to delete the associated column 302 or row 304 upon releasing the touch.

Figure 6A:
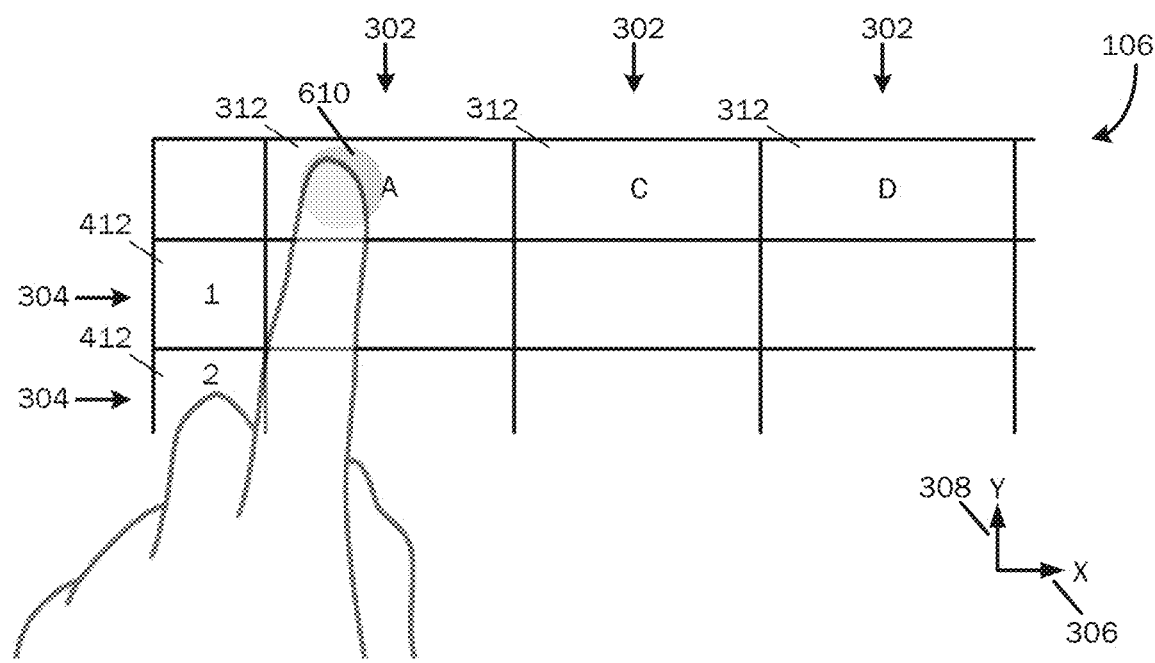
FIGS. 6A-6B illustrate a tap-hold-pull gesture.
Figure 6B:
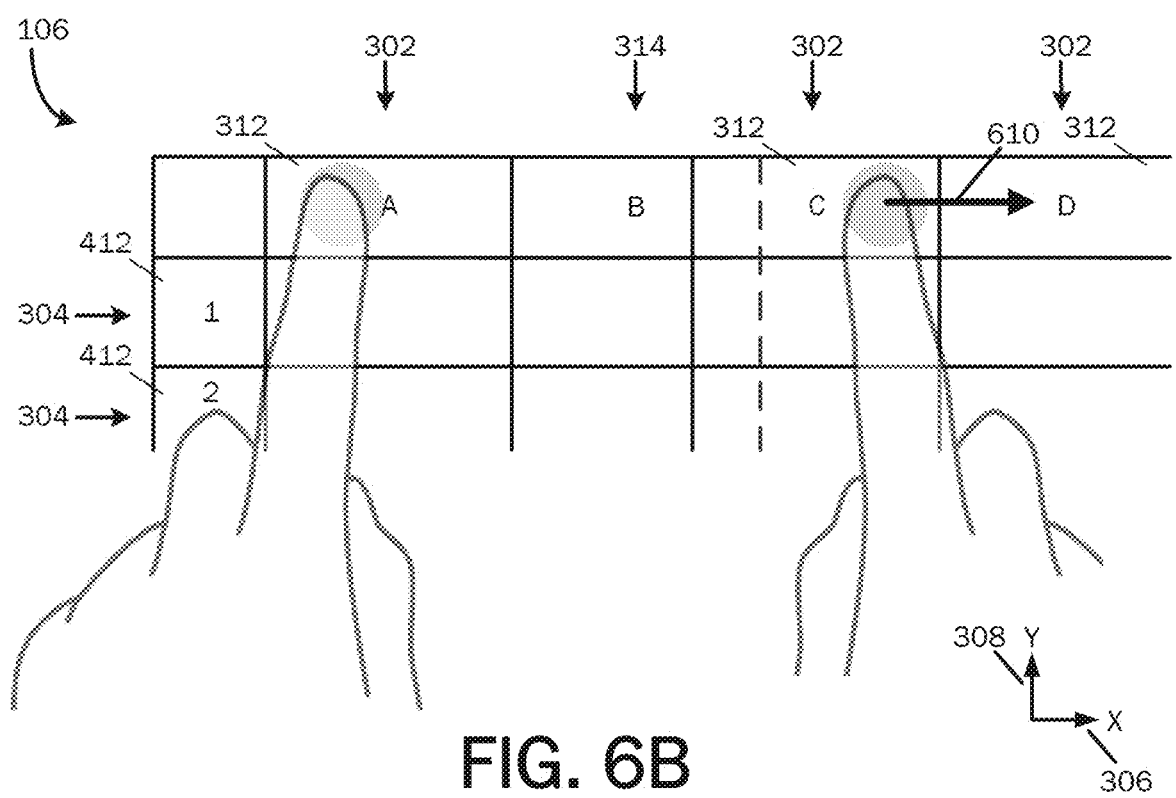

FIGS. 6A and 6B show a touch-hold-pull gesture to reveal a hidden column 314 within a spreadsheet 106. FIG. 6A shows a spreadsheet 106 before a hidden column 302 is shown via a touch-hold-pull gesture 610, and FIG. 6B shows the same spreadsheet 106 while performing a hidden column revelation operation via a touch-hold-pull gesture 610. According to an embodiment, a touch-hold-pull gesture 610 may be detected when a user selects a first column 302, for example, by touching a touchscreen 116 on the column header 312 associated with the first column with a finger on one hand 208, and holding his finger on the column header 312; then selects a second column 302, for example, by touching on the column header 312 associated with the second column with a finger on his other hand 208; and pulls the second column header 312 in a direction along the X-axis 306 away from the first column 302 as indicated by gesture 610. When the user releases the column headers 312 a hidden column 314 beneath the second column 302 may be revealed. The width of the hidden column 314 and the number of hidden columns 314 (if there are multiple hidden columns 314) revealed may be determined by how far the user pulls the second column 302 away from the first column 302.

According to an embodiment, one or more hidden rows may be revealed in a spreadsheet 106 via selecting a row 304, for example, by a user selecting a first row header 412 via touching the first row header 412 with a finger on one hand, and holding his finger on the first row header 412; then selecting a second row 306, for example, by touching the second row header 412 with a finger on the user's other hand; then pulling the second column header 412 in a direction along the Y-axis 308 away from the first row 304. When the user releases the row headers 412 a hidden row beneath the second row 304 may be revealed. The height of the hidden row and the number of hidden rows (if there are multiple hidden rows) revealed may be determined by how far the user pulls the second row 304 away from the first row 304. A live preview of the hidden column 314/row revelation operation may be displayed such that the user may be able to determine how far he needs to drag the column header 312 or row header 412 to reveal the hidden column(s) 314 or rows.

Figure 7A:
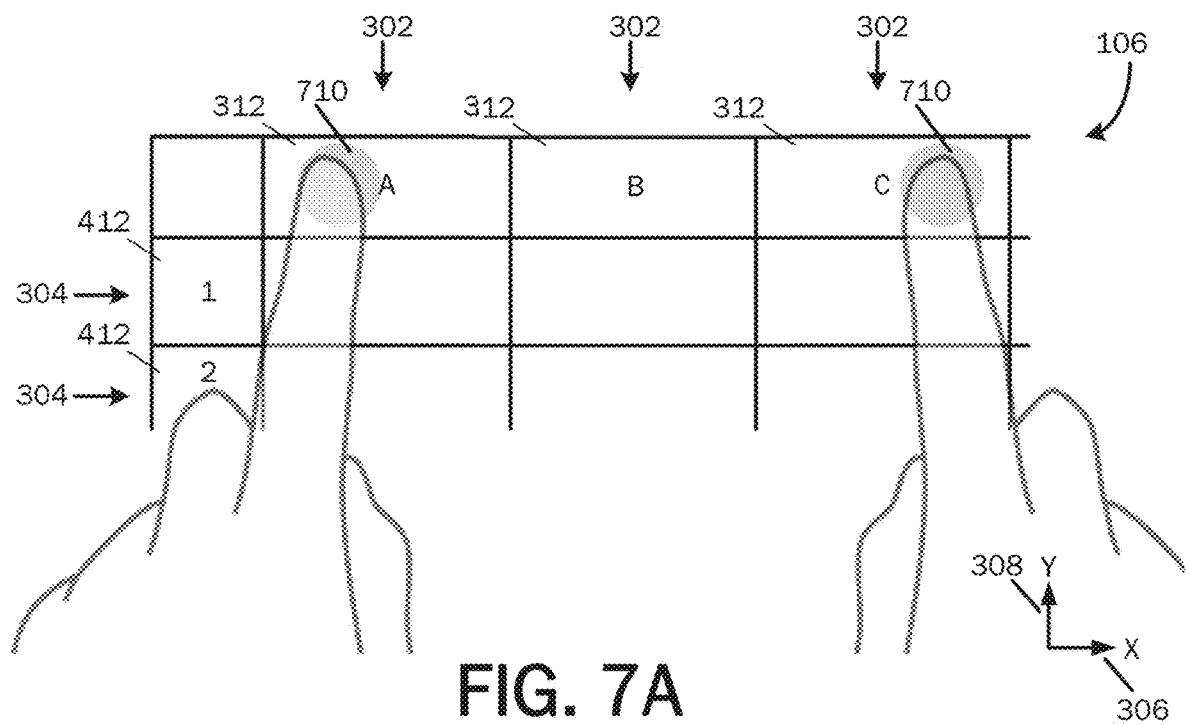
FIGS. 7A-7B illustrate a push-together gesture.
Figure 7B:
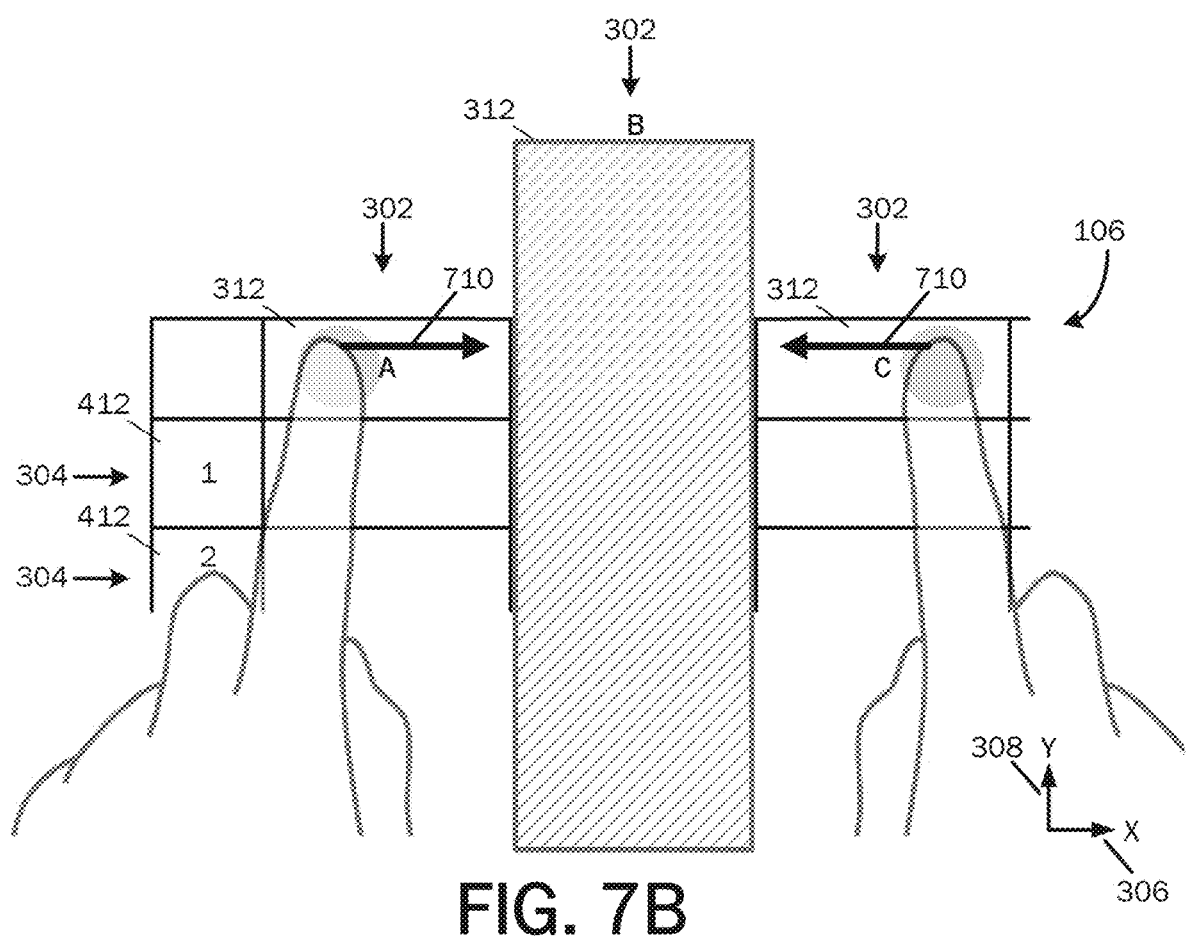

FIGS. 7A and 7B show a push-together gesture to hide one or more columns within a spreadsheet 106. As illustrated, FIG. 7A shows a spreadsheet 106 before pushing together columns 302 to hide one or more columns 302, and FIG. 7B shows the same spreadsheet 106 while performing a column hiding operation via a push-together gesture 710. According to an embodiment, a push-together gesture 710 may be detected when a user touches a touchscreen 116 with two of his fingers and pushes them together as indicated by gesture 710. To perform a column hiding operation via the push-together gesture 710, the user may select a first column 302 in a spreadsheet 106, for example, by touching a column header 312 associated with the first column 302; select a second column 302, for example, by touching the column header 312 associated with the second column 302; and may utilize the push-together gesture 710 along the X-axis 306 to hide one or more columns 302 between the first and second columns 302. Depending on how far apart the user moves his fingers, one or more columns 302 may be hidden.

According to an embodiment, one or more rows 304 may be hidden in a spreadsheet 106 via selecting two non-adjacent rows 304, and utilizing the push-together gesture 710 along the Y-axis 308. Depending on how far apart the user moves his fingers, one or more rows 304 may be hidden. A live preview of the column/row hiding operation may be displayed such that the user may be able to determine a number of columns 302 or rows 304 that will be hidden upon releasing the touch.

According to another embodiment, the push-together gesture 710 may be utilized in the same manner as described with respect to FIGS. 7A and 7B to perform a column 302 or row 304 deletion operation. Rather than hiding one or more columns 302 or rows 304 when two columns 302 or two rows 304 are pushed together, the one or more columns 302 or rows 304 may be deleted.

Figure 8A:
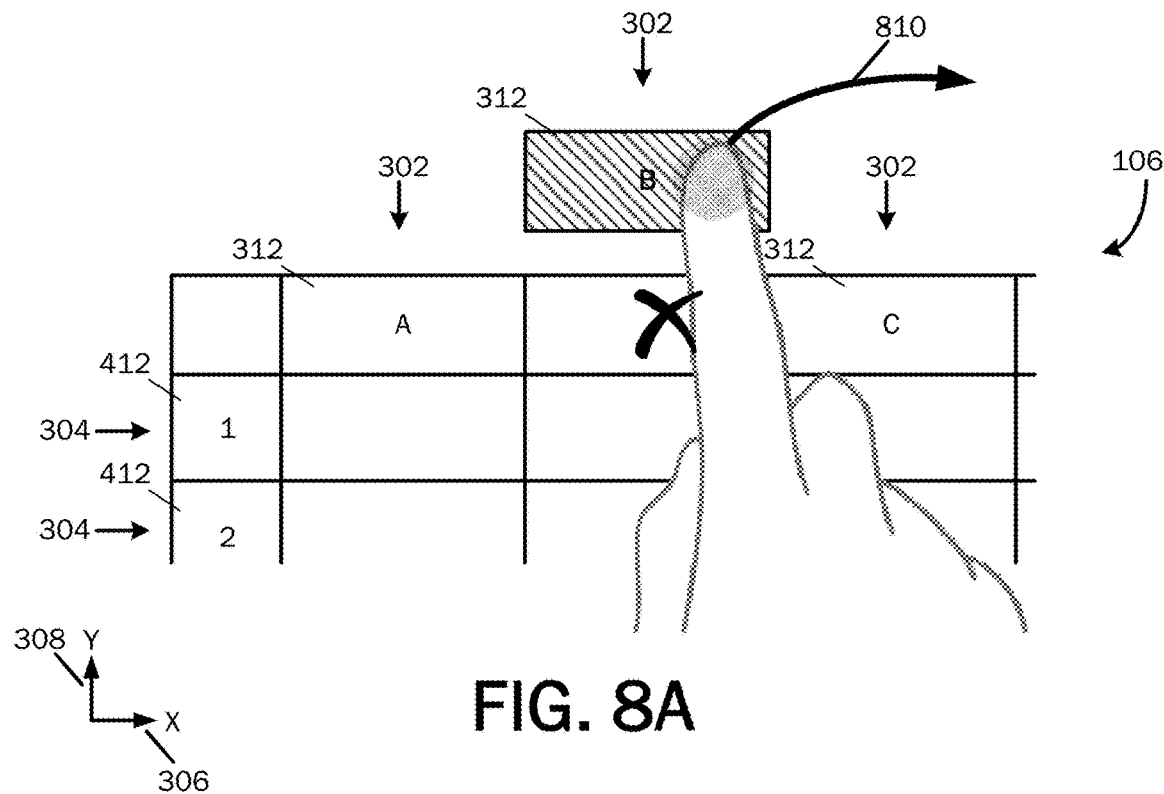
FIGS. 8A-8B illustrate a drag-and-drop between gesture.
Figure 8B:
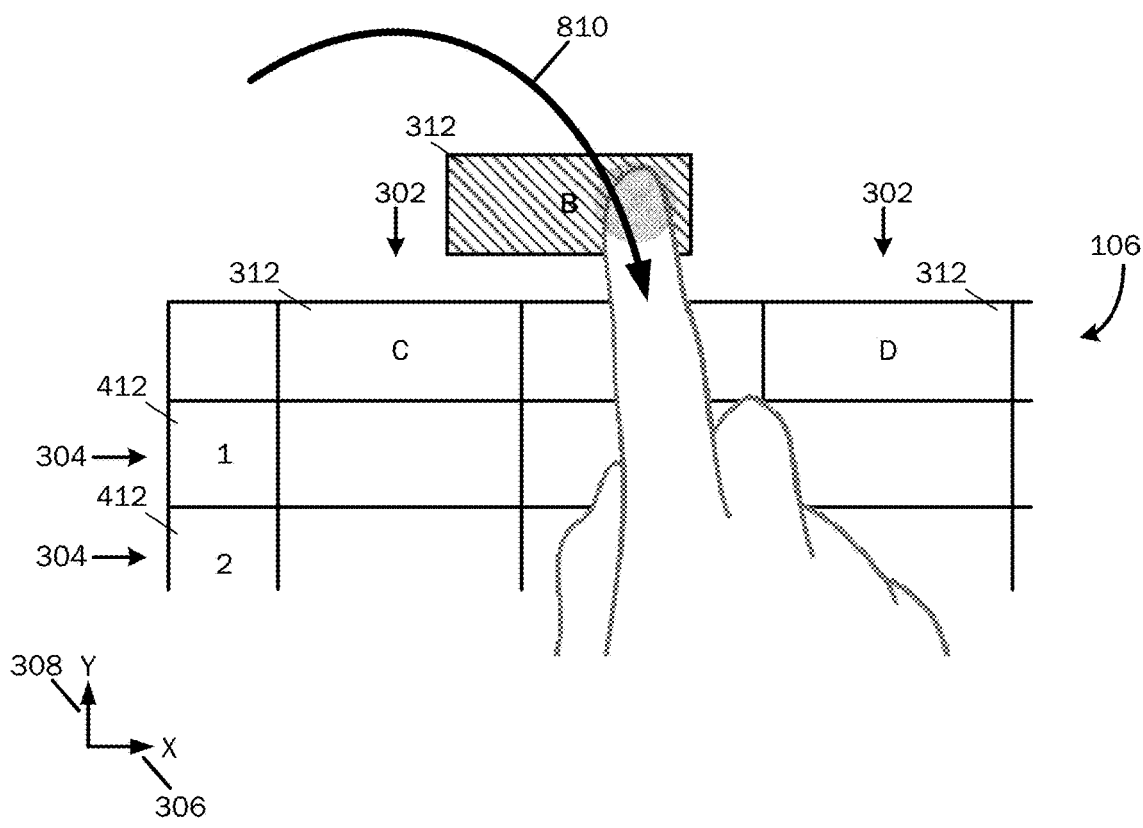

FIGS. 8A and 8B show a drag-and-drop between gesture to move a column within a spreadsheet 106. As illustrated, FIGS. 8A and 8B show a spreadsheet 106 while performing the column moving operation via a drag-and-drop between gesture 810. According to an embodiment, a drag-and-drop between gesture 810 may be detected when a user selects a column 302, for example, by touching a touchscreen 116 on an associated column header 312 with a finger, and drags the column header 312 away from its current position in the spreadsheet 106, and into a new position between two columns 302 as indicated by gesture 810. When the user releases the column header 312 when it has been dragged between two other column headers 312, the associated column 302 may be moved to the position between the two columns associated with the two other column headers 312.

According to an embodiment, one or more rows 304 may be moved within a spreadsheet 106 via selecting a row 304, for example, by a user selecting a row header 412 of a row he wishes to move, and utilizing the drag-and-drop between gesture 810 to drag the row header 412 away from its current location and drag the row header 412 between two other row headers 412. When the user releases the row header 412, the associated row 304 may be moved between the two rows 304 associated with the two other row headers 412. A live preview of the column/row move operation may be displayed such that the user may be able to see where the selected column 302 or row 304 may be placed upon releasing the touch.

Figure 9A:
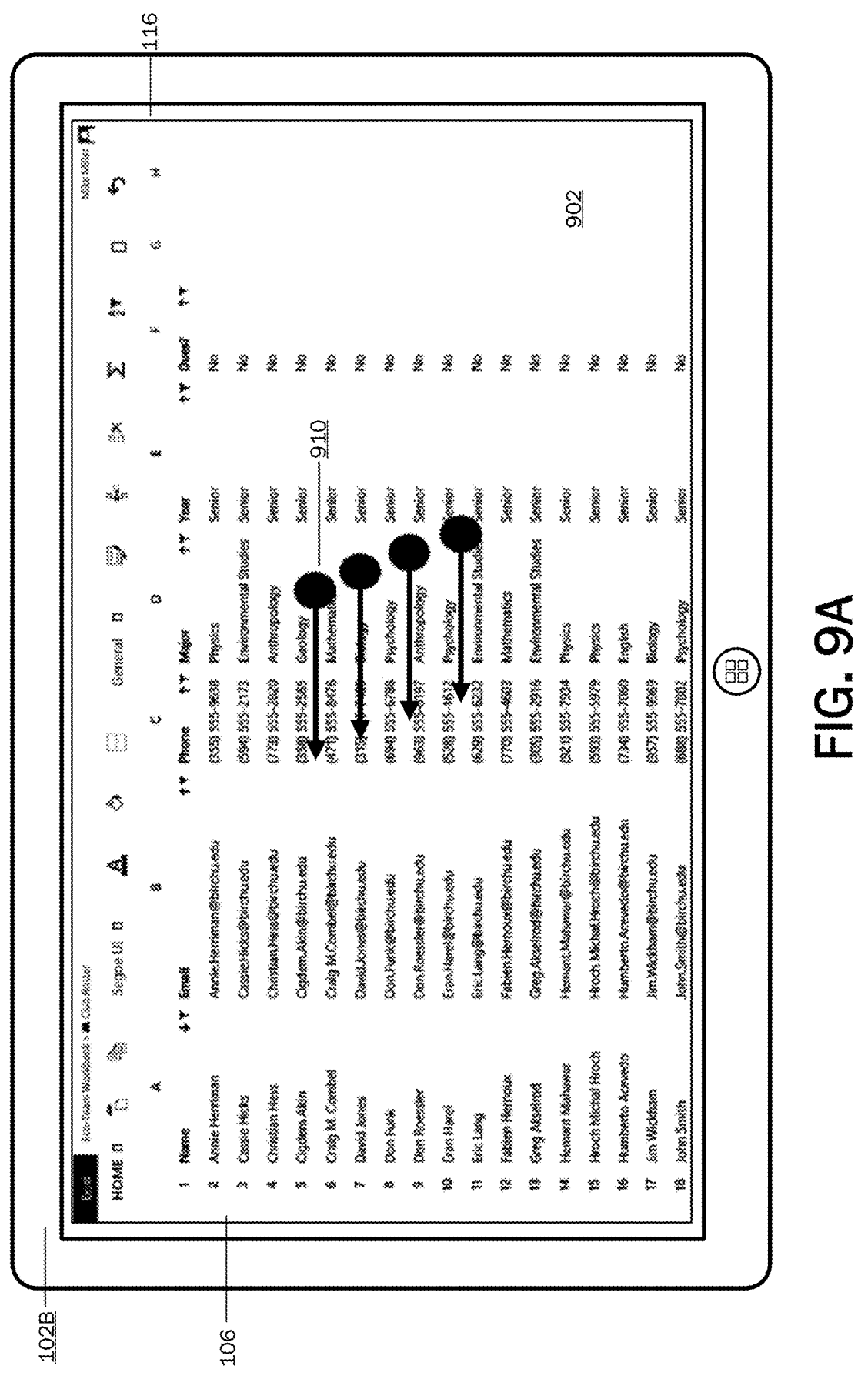
Figure 9B:
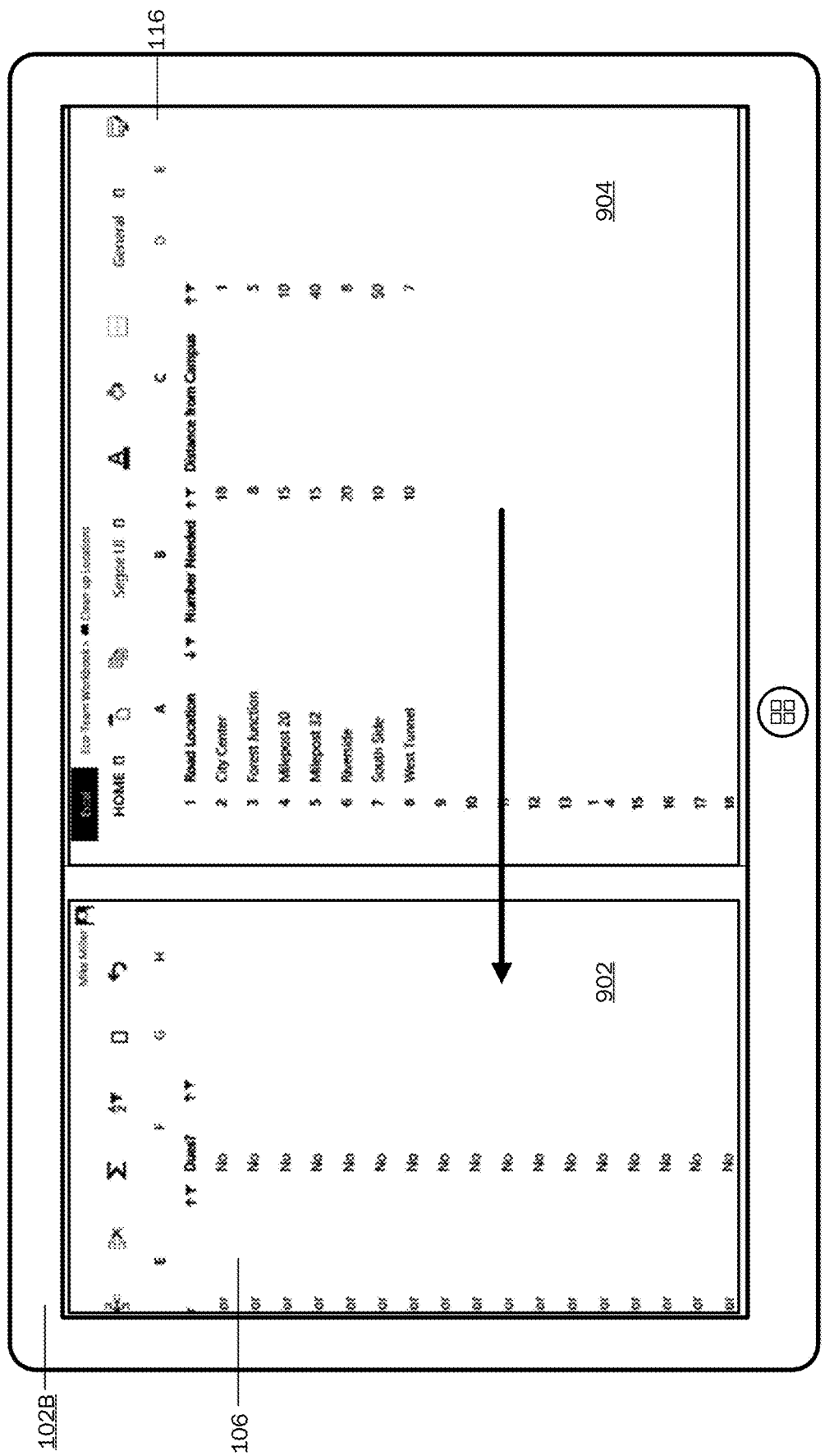
Figure 9C:
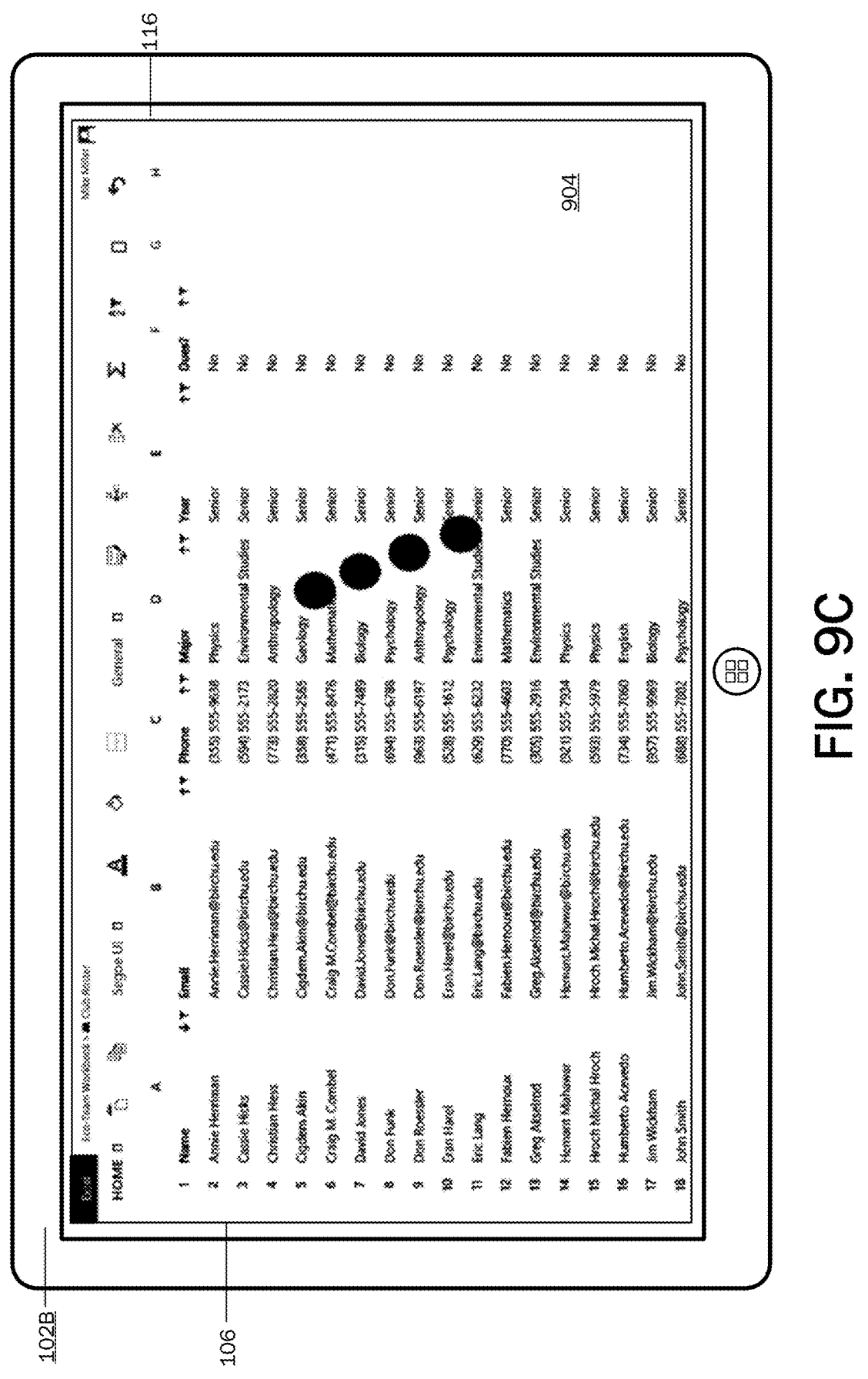

FIGS. 9A, 9B, and 9C show a multi-finger or multi-touch swipe gesture to navigate between individual pages or sheets (herein referred to as sheets 902,904) in a spreadsheet 106 document. As illustrated, FIG. 9A shows a first sheet 902 of a spreadsheet 106 displayed before navigating to a next sheet 904 of the spreadsheet 106 via a multi-finger swipe gesture 910, FIG. 9B shows the first sheet 902 of the spreadsheet 106 being panned out of display while a second sheet 904 is being panned into the display via a multi-finger swipe gesture 910, and FIG. 9C shows the second sheet 904 of the spreadsheet 106 after it has been panned into view. According to an embodiment, a multi-finger swipe gesture 910 may be detected when a user touches a touchscreen 116 with multiple fingers, and swipes a spreadsheet 106 in a lateral direction along the X-axis 306 as indicated by gesture 910.

The speed of the movement of the multi-finger swipe gesture 910 may be used in determining a speed of the panning of the spreadsheet 106. For example, a sudden movement in a direction may increase the speed of the panning action. According to one embodiment, a multi-finger swipe gesture 910 may perform a pan to a single next sheet 904, or alternatively, according to another embodiment, a user may pan through multiple sheets 902,904 with a single multi-finger swipe gesture 910, depending on the speed of the gesture.

Figure 10A:
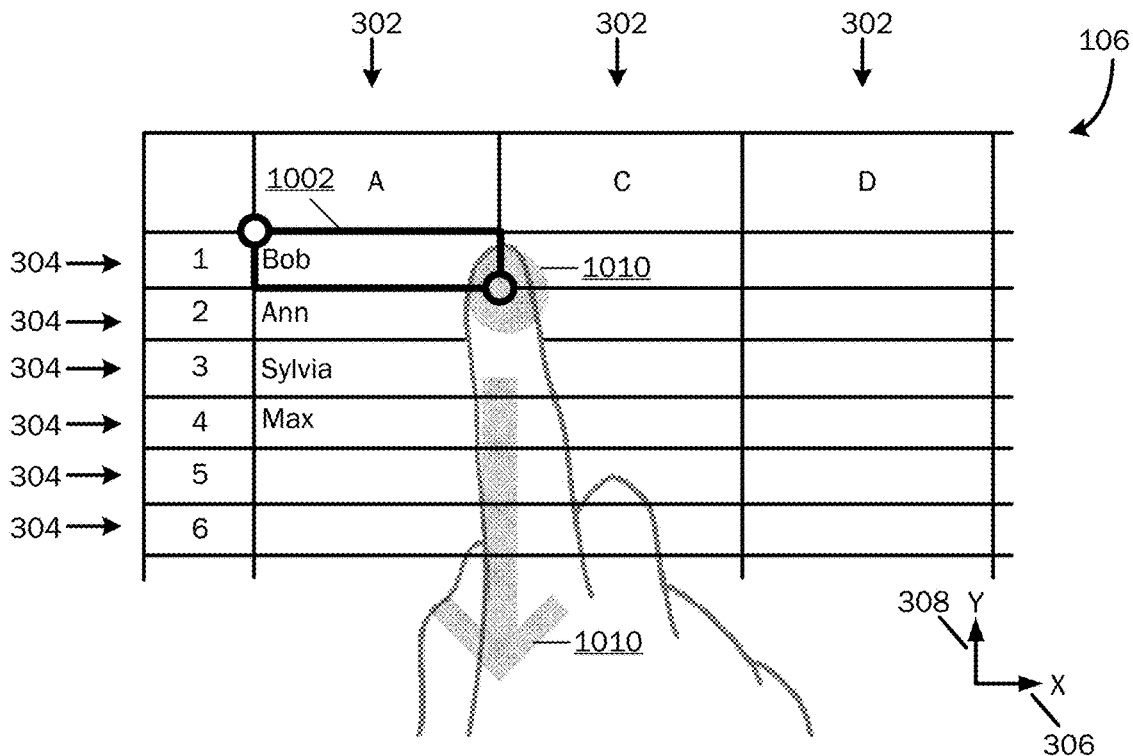
FIGS. 10A-10D illustrate a touch-and-throw gesture.
Figure 10B:
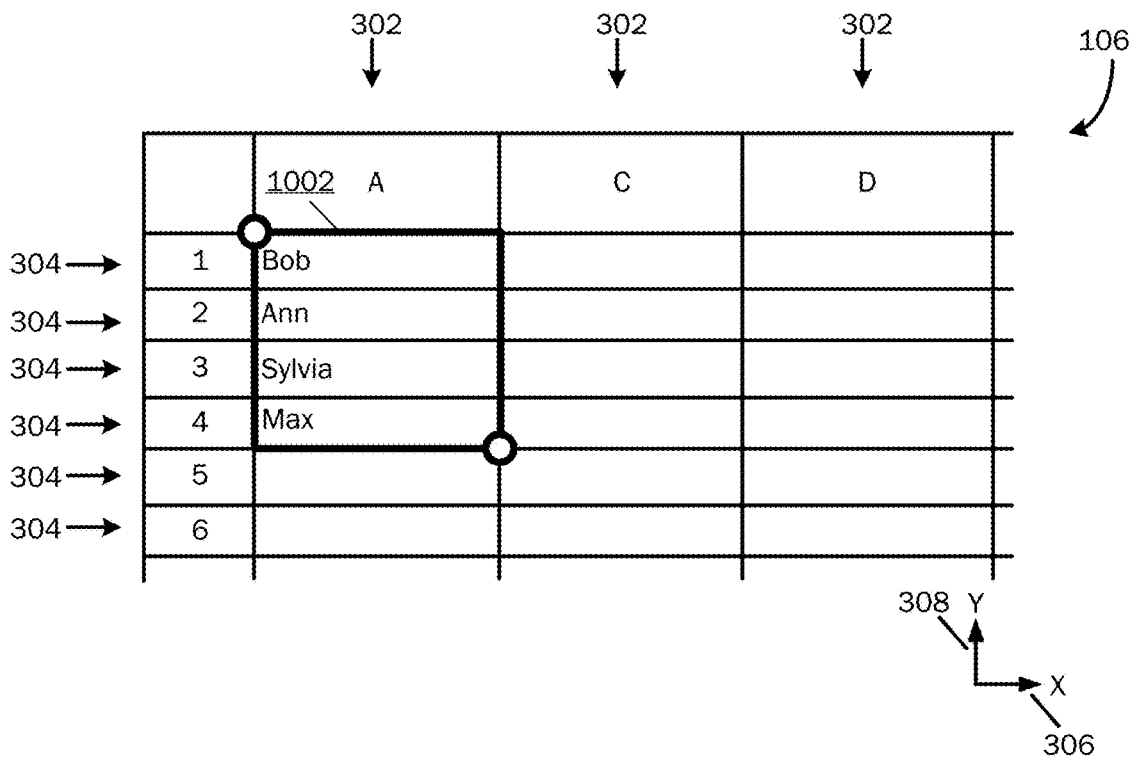

FIGS. 10A and 10B show a touch-and-throw gesture for extending a selected functionality from one portion of a spreadsheet document to another portion of the document. According to one embodiment, the touch-and-throw gesture may be used to extend a selection of one or more cells to a last non-blank cell in the same column 302 or row 304 as the selected cell(s), or if the next cell is blank, to extend the selection to a next nonblank cell within a spreadsheet 106. FIG. 10A shows a spreadsheet 106 where a cell is selected, a selection handle 1002 is displayed around the selected cell, and a user touches the selection handle 1002 and "throws" it over other cells in the column 302 via a touch-and-throw gesture 1010. FIG. 10B shows the same spreadsheet 106 after performing a selection extension operation via a touch-and-throw gesture 1010. According to an embodiment, a touch-and-throw gesture 1010 may be detected when a user selects a selection handle 1002, for example, by touching a touchscreen 116 on a selection handle 1002 displayed around one or more cells, and "throws" the selection handle 1002 in a direction along the Y-axis 308 as indicated by gesture 1010. Accordingly, the selection may be extended to a last nonblank cell in the same column 302 as the selected cell(s), or if the next cell is blank, the selection may be extended to a next nonblank cell.

According to an embodiment, a selection of one or more cells in a row 304 may be extended via selecting a selection handle 1002 displayed around the selected cell(s), and utilizing the touch-and-throw gesture 1010 to "throw" the selection handle 1002 in a direction along the X-axis 306. Accordingly, the selection may be extended to a last nonblank cell in the same row 304 as the selected cell(s), or if the next cell is blank, the selection may be extended to a next nonblank cell.

Figure 10C:
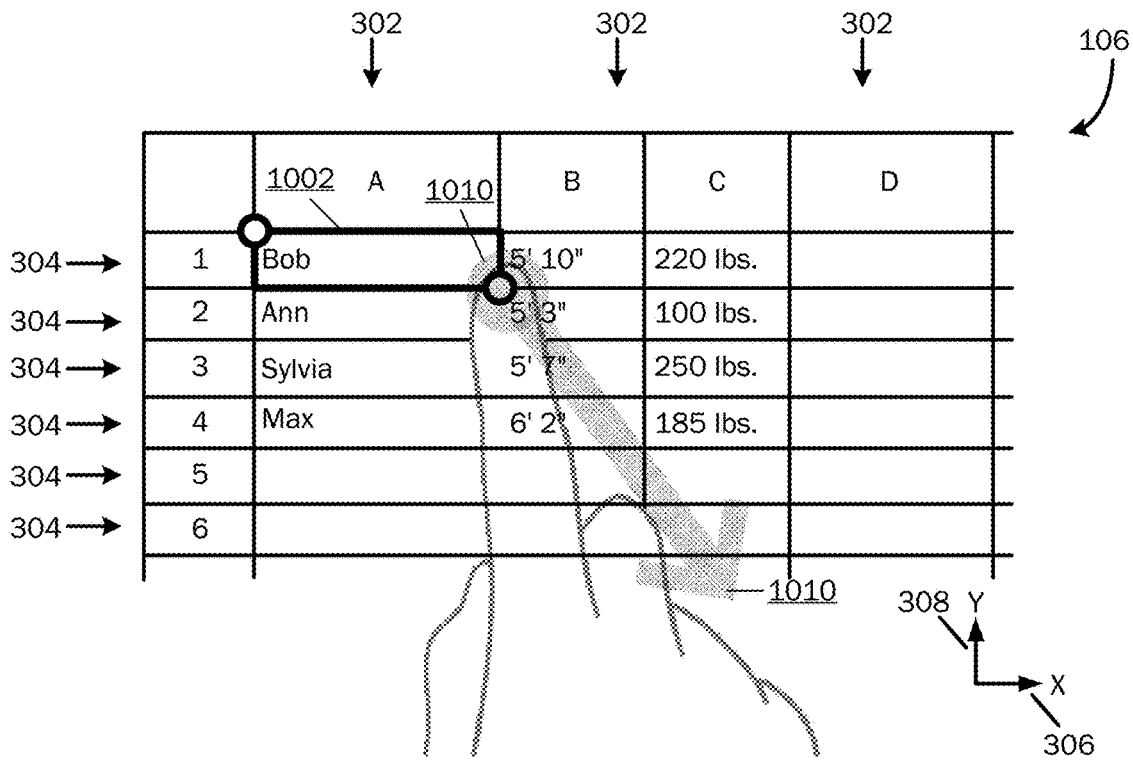
Figure 10D:
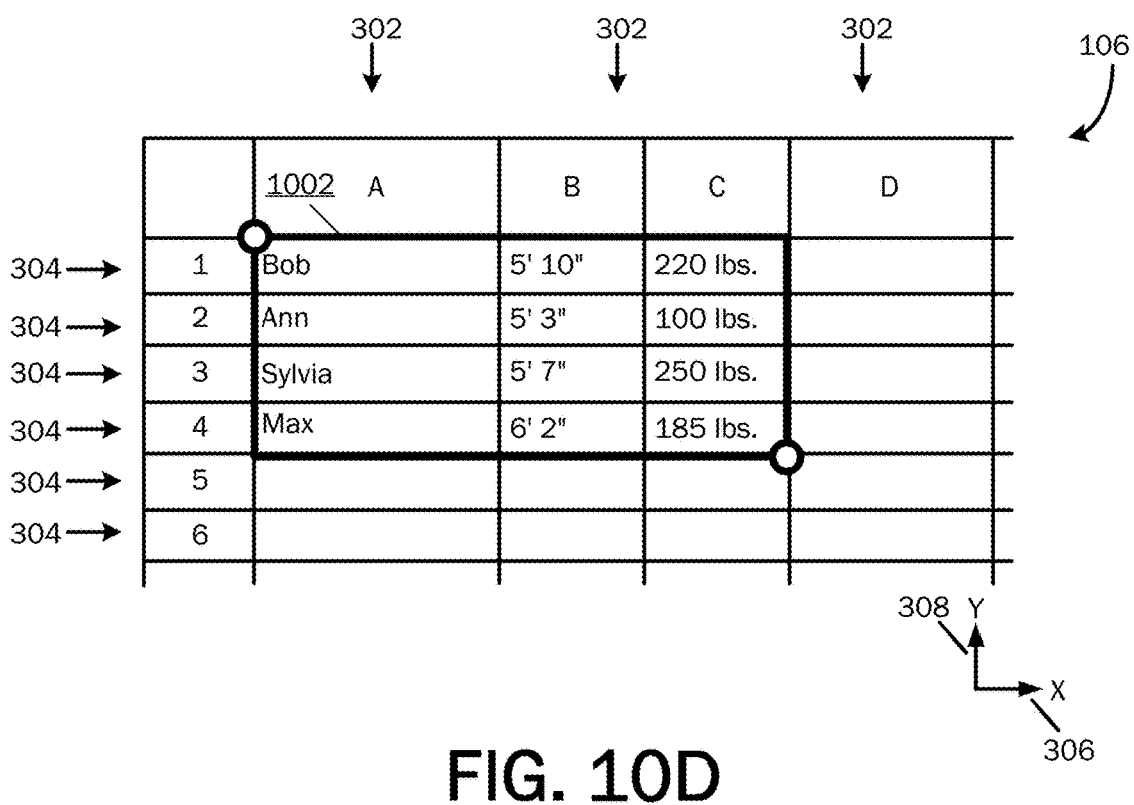

According to another embodiment, a selection may be extended to a contiguous block of data contained in cells in multiple columns 302 and multiple rows 304 via selecting a selection handle 1002 displayed around a selected cell or cells, and utilizing the touch-and-throw gesture 1010 to "throw" the selection handle 1002 in a diagonal direction. For example, FIG. 10C shows a spreadsheet 106 where a cell is selected, a selection handle 1002 is displayed around the selected cell, and a user touches the selection handle 1002 and "throws" it at an angle over other cells in a block of data, wherein the block of data comprises multiple columns 302 and rows 304 via a touch-and-throw gesture 1010. FIG. 10D shows the same spreadsheet 106 after performing a selection extension operation via a touch-and-throw gesture 1010. According to an embodiment, a touch-and-throw gesture 1010 may be detected when a user selects a selection handle 1002, for example, by touching a touchscreen 116 on a selection handle 1002 displayed around one or more cells, and "throws" the selection handle 1002 in an angular direction (along both the X-axis 306 and the Y-axis 308) as indicated by gesture 1010. Accordingly, the selection may be extended to select a contiguous block of rectangular data as illustrated in FIG. 10D.

Figure 11A:
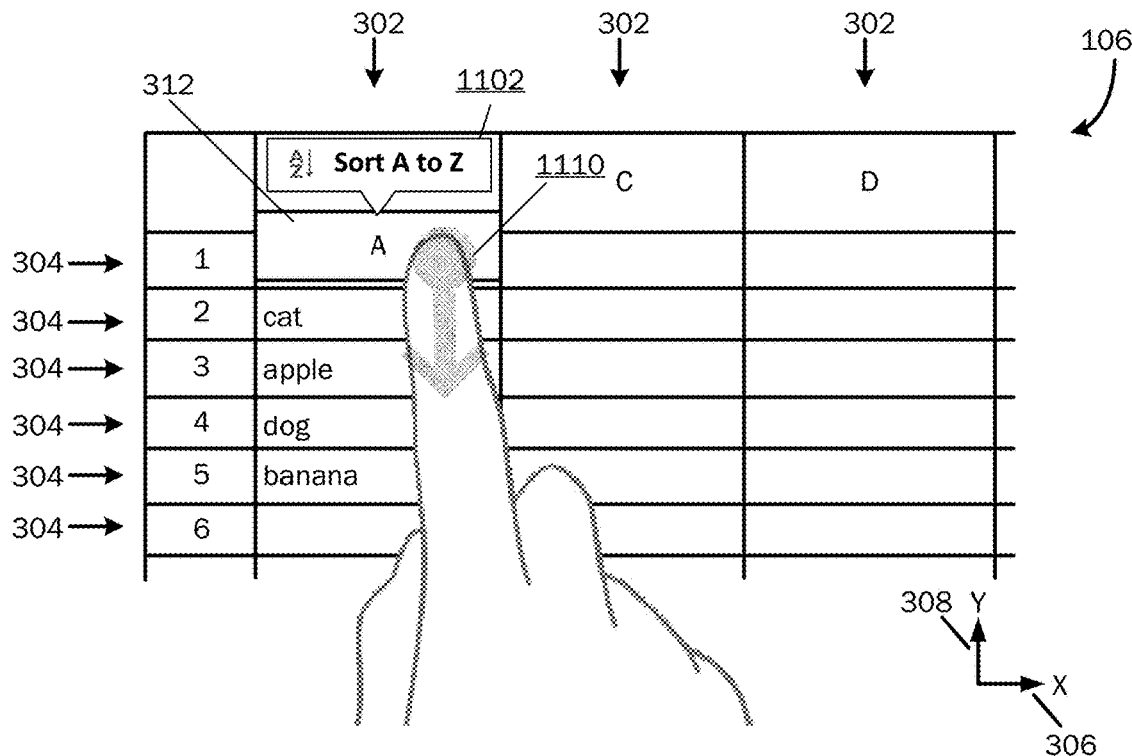
FIGS. 11A-11B illustrate a touch-and-pull gesture.
Figure 11B:
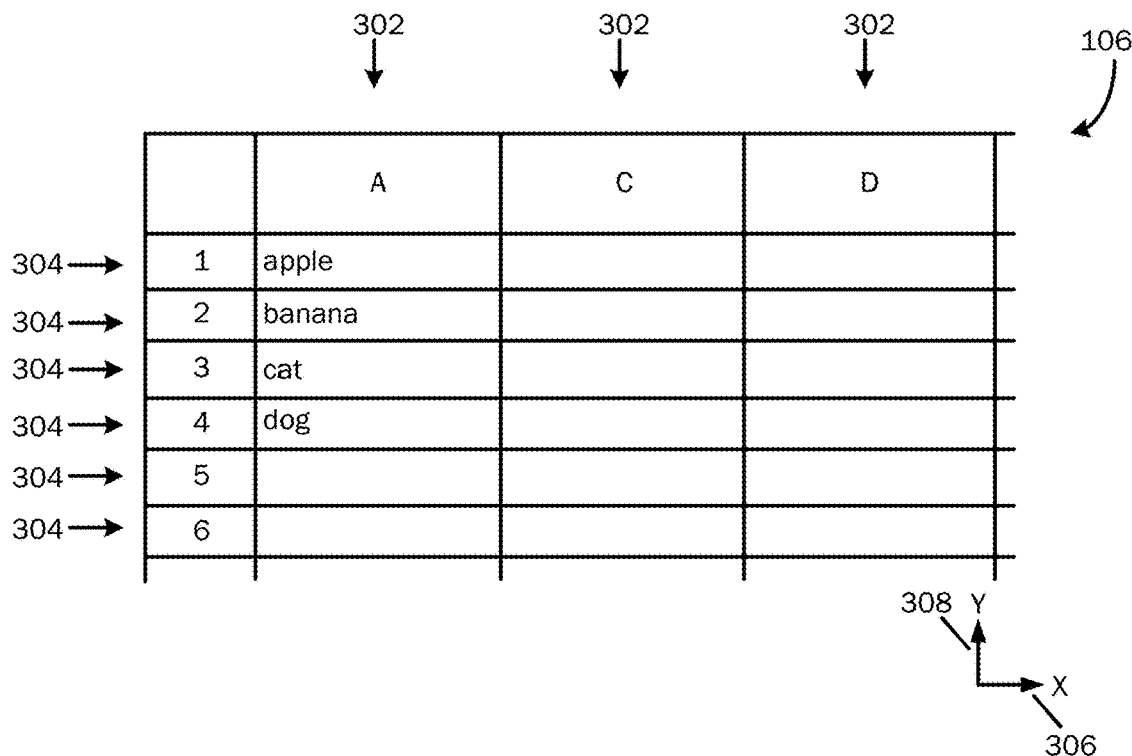

FIGS. 11A and 11B show a touch-and-pull gesture to sort data. As illustrated, FIG. 11A shows a spreadsheet 106 as a user selects a column header 312 and pulls it downward, and FIG. 11B shows the same spreadsheet 106 after performing a sort operation via a touch-and-pull gesture 1110. A UI element 1102 may be displayed, providing an indication of a sort operation. According to an embodiment, a touch-and-pull gesture 1110 may be detected when a column header 312 is selected, for example, by touching a touchscreen 116 where a column header 312 is displayed, and pulled downward along the Y-axis 308 as indicated by gesture 1110. Accordingly, the data in the column 302 may be sorted as illustrated in FIG. 11B.

According to an embodiment, sorting of data in a row 304 may be performed via utilizing the touch-and-pull gesture 1110. A row header 412 may be selected and pulled in a direction along the X-axis 306. Accordingly, the data in the row associated with the selected row header 412 may be sorted. According to an embodiment, as the column header 312 or a row header 412 is pulled, a visual indicator may be displayed, wherein the visual indicator may inform the user as to how far he may need to drag the header 312,412, and then release it, before the sort is invoked. If the distance does not reach a predetermined threshold before release, the sort may not be invoked.

Figure 12A:
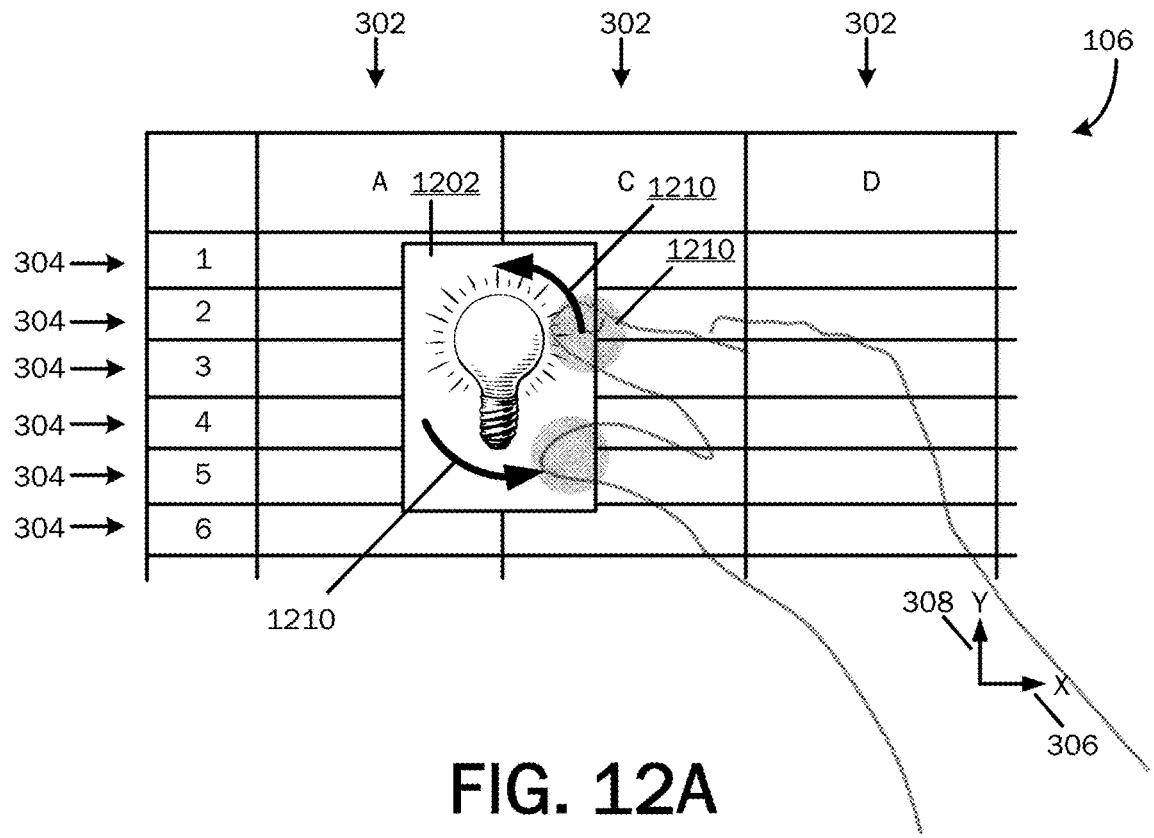
FIGS. 12A-12B illustrate a pinch-and-turn gesture.
Figure 12B:
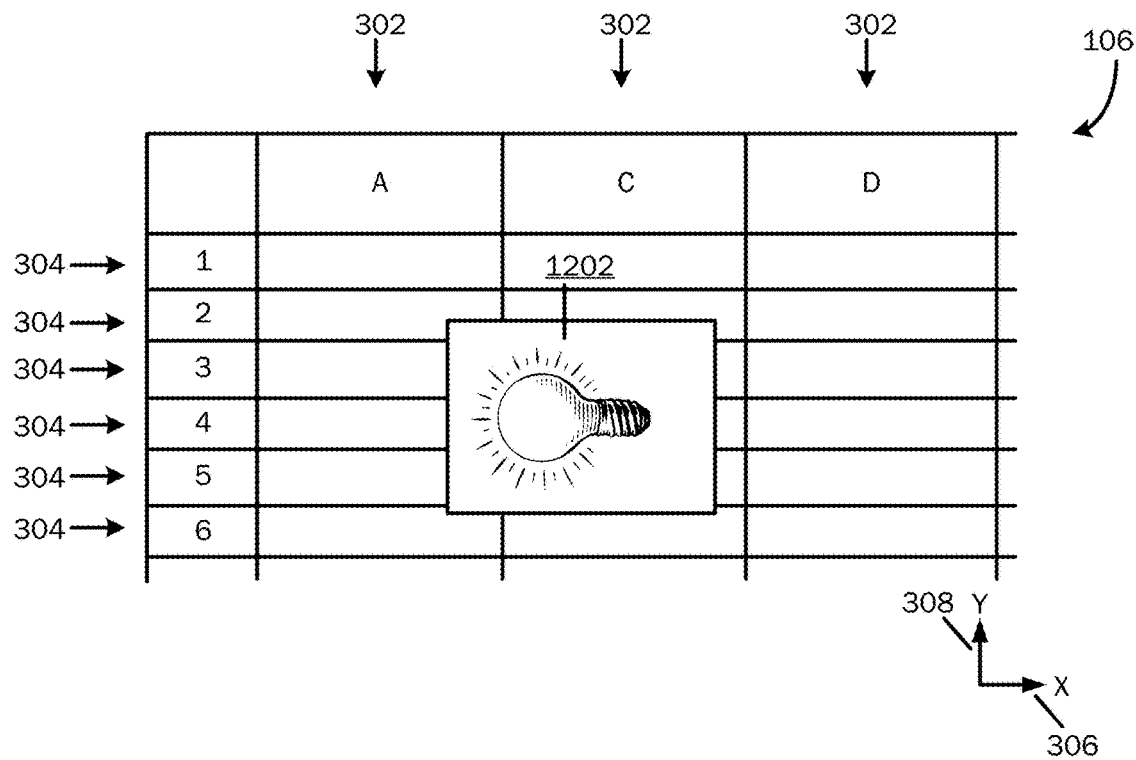

FIGS. 12A and 12B show a pinch-and-turn gesture to rotate an element. As illustrated, FIG. 12A shows a spreadsheet 106 as a user selects an element 1202 and rotates it, and FIG. 12B shows the same spreadsheet 106 after performing a rotate operation via a pinch-and-turn gesture 1210. According to an embodiment, a pinch-and-turn gesture 1210 may be detected when an element 1202 (e.g., text, picture, etc.) is selected, for example, by using two or more fingers to touch a touchscreen 116 where an element 1202 is displayed, and turning it in a circular motion as indicated by gesture 1210. Accordingly, the element 1202 may be rotated as illustrated in FIG. 12B. Although displayed in a spreadsheet, it is to be understood that utilizing a pinch-and-turn gesture 1210 to rotate an element 1202 may be performed in various types of applications 104.

Embodiments may comprise discontiguous selection via a select-pin-select gesture. For example, where data may not be displayed in adjacent cells, a user may make a first selection of data with his finger, pin the selection, and then select a next selection of data. Pinning may be accomplished via various ways, which may include selection of a UI element that may be displayed next to the first selection, for example, by touching the UI element with another finger, by pressing and holding the first selection, etc. After the first selection is pinned, the user may be able to select a next set of data.

Figure 13A:
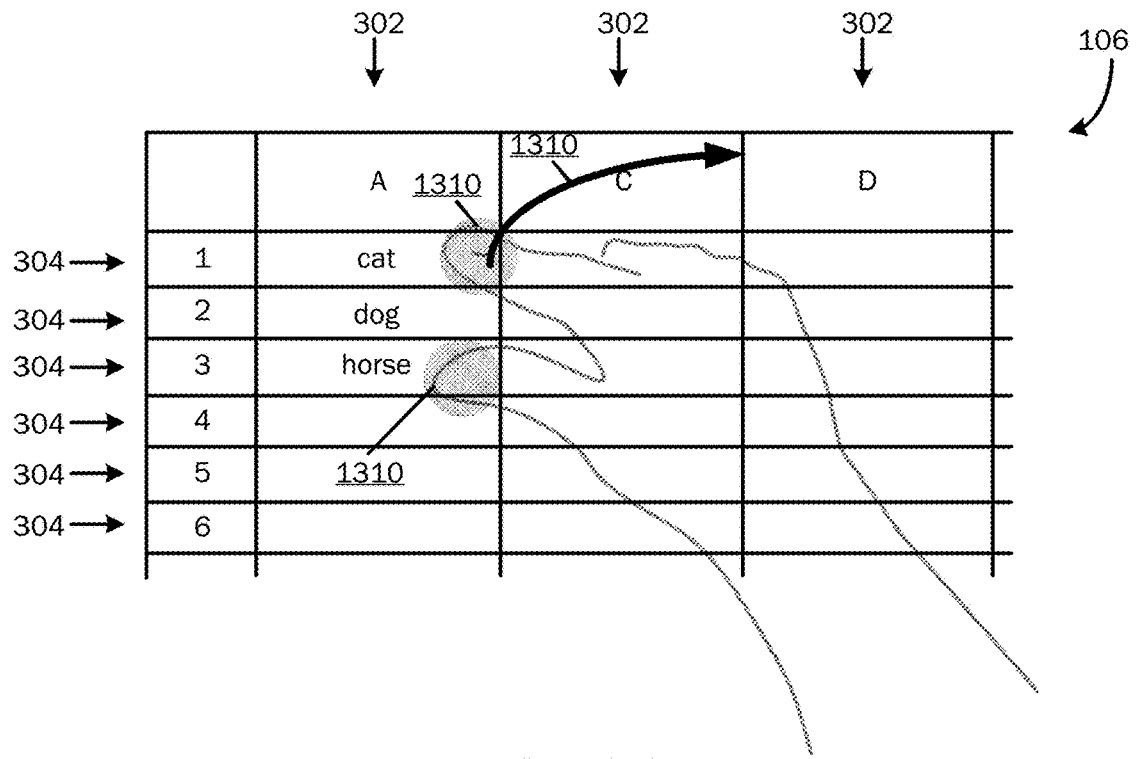
FIGS. 13A-13B illustrate a multi-finger tear-and-pull gesture.
Figure 13B:
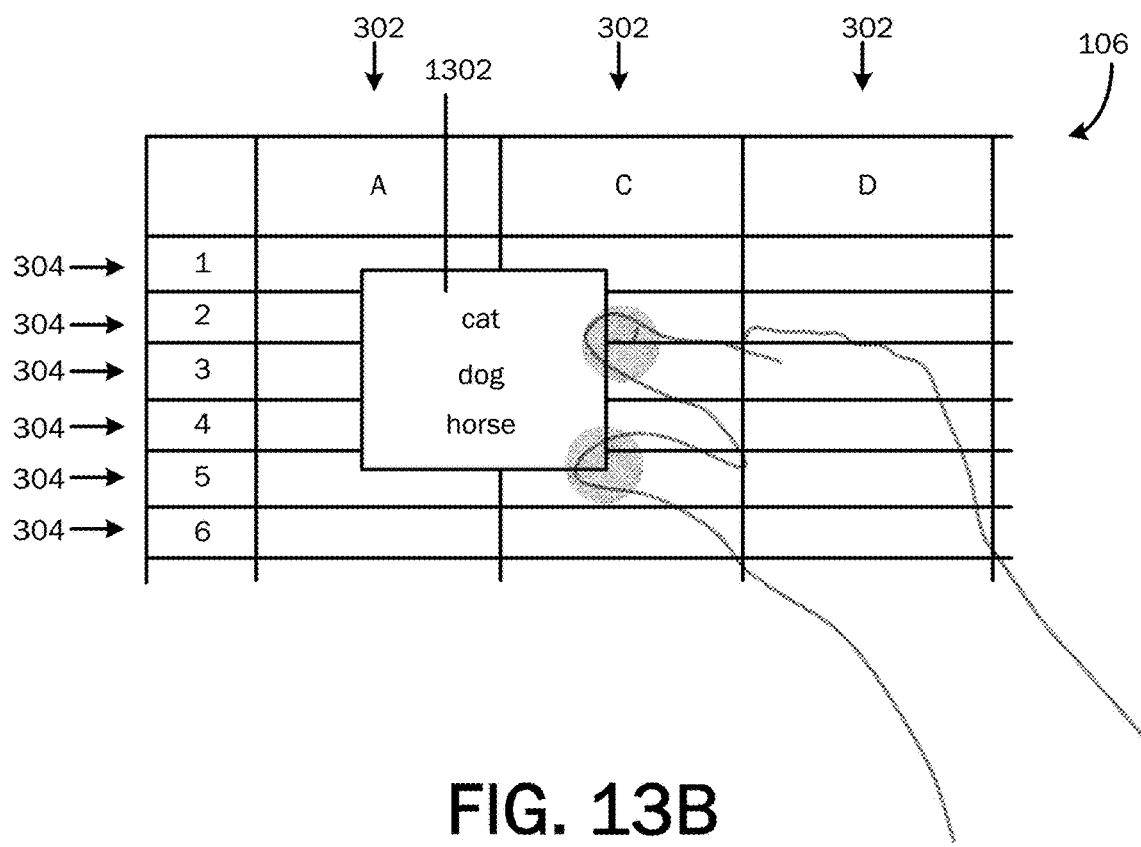

FIGS. 13A and 13B show a multi-finger tear-and-pull gesture to "tear" objects out of a grid and to float on top of the grid or move to a canvas. As illustrated, FIG. 13A shows a spreadsheet 106 as a user selects data from the spreadsheet 106 via a multi-touch selection and tears/pulls the data from the spreadsheet 106, and FIG. 13B shows the same spreadsheet 106 after performing the "tear" operation via a tear-and-pull gesture 1310. According to an embodiment, a tear-and-pull gesture 1310 may be detected when data or an object is selected, for example, by using two or more fingers to touch a touchscreen 116 where the data or object is displayed, and pulling the data or object from its current position as indicated by gesture 1310. Accordingly, the data or object may be "torn out" of the grid and may float on top of the grid or moved to a canvas as illustrated in FIG. 13B. Although displayed in a spreadsheet, it is to be understood that utilizing a multi-finger tear-and-pull gesture 1310 to remove data as a separate element may be performed in various types of applications 104.

Figure 14:
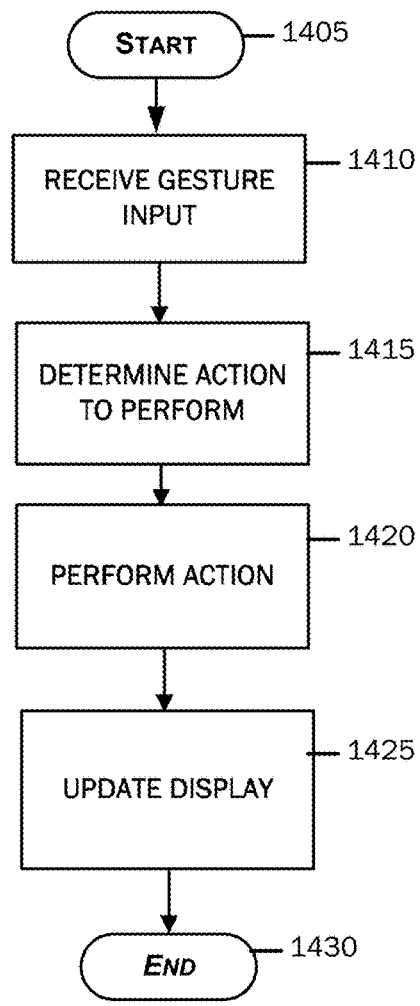
FIG. 14 shows one embodiment of a method for providing natural quick function gestures.

With reference now to FIG. 14, a flow chart illustrating a method 1400 for using gestures to interact with a spreadsheet 106 will be described. The method 1400 starts at OPERATION 1405, and proceeds to OPERATION 1410, where a gesture is received. The gesture may be any of the gestures described herein or other recognized gestures, such as a pulling apart gesture 310, a touch-and-slide gesture 410, a drag-and-drop gesture 510, a tap-hold-pull gesture 610, a push-together gesture 710, a drag-and-drop between gesture 810, a multi-finger swipe gesture 910, a touch-and-throw gesture 1010, a touch-and-pull gesture 1110, a pinch-and-turn gesture 1210, a multi-finger tear-and-pull gesture 1310, a select-pin-select gesture, and the like may be received. According to one embodiment, the user places at least a portion of their hand 208 (e.g. one or more fingers) on the touch surface 116. Additionally, according to some embodiments, the user may place his hand 208 near the surface of the touch surface 116 but not on the touch surface 116.

The method 1400 may proceed to OPERATION 1415, where an action to be performed may be determined. According to an embodiment, the action relates to interacting with a spreadsheet 106 and comprises actions such as inserting, deleting, moving, hiding, revealing, panning, sorting, selecting, rotating, removing, and the like. While the actions described relate to interaction with spreadsheets 106, other applications 104 may be utilized with the gestures described.

Flowing to OPERATION 1420, the determined action may be performed. Generally, the action relates to manipulating data in a spreadsheet 106. For example, a column 302 or row 304 may be deleted, moved, inserted, sorted, or selected, or some other operation may be performed on data, and the like.

The method 1400 may proceed to OPERATION 1425, where the display may be updated. The display may be updated in response to the action performed per the gesture information that is received. The method 1400 may end at OPERATION 1430.

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 15:
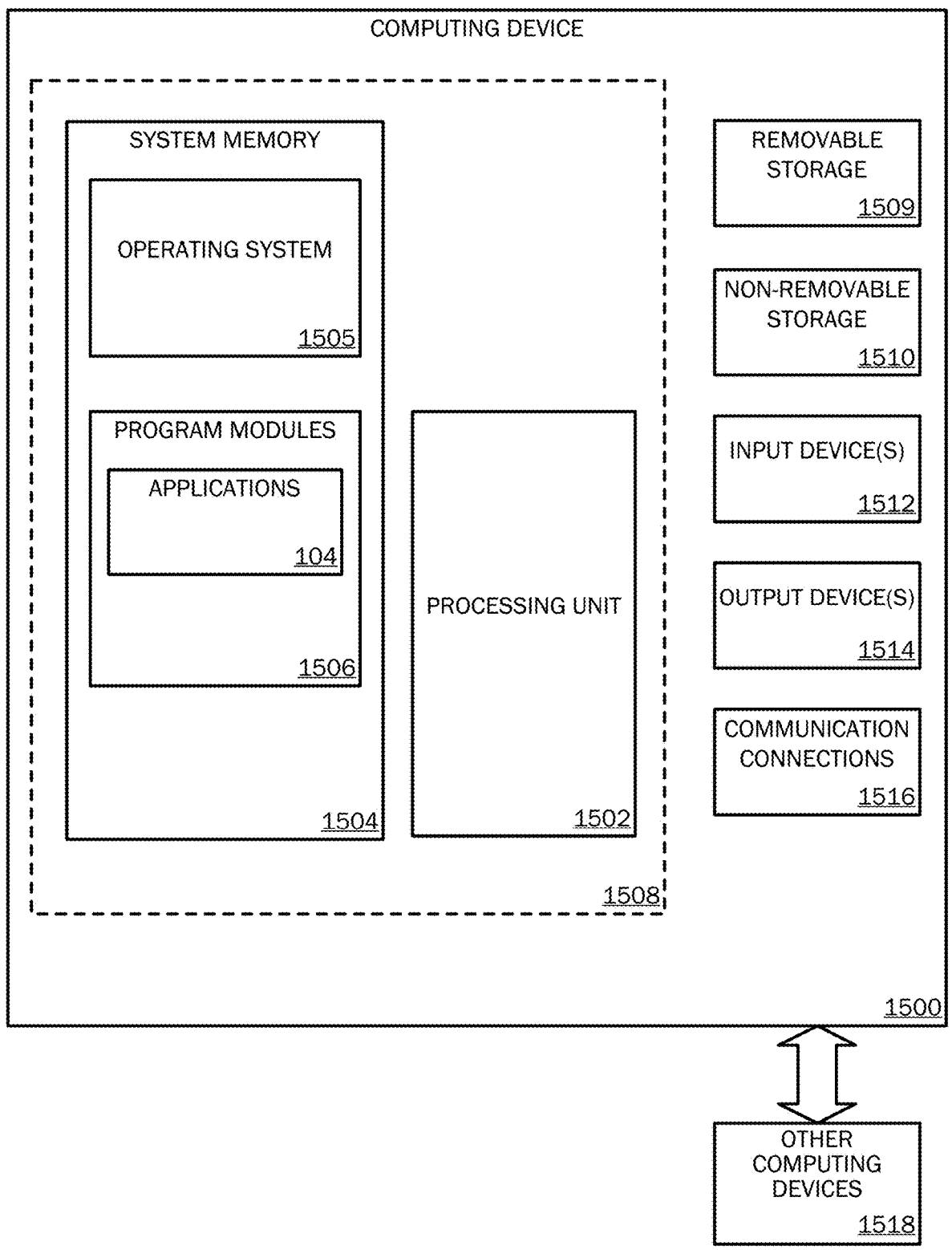
FIG. 15 is a block diagram illustrating one embodiment of the physical components of a computing device with which embodiments of the invention may be practiced.
Figure 16A:
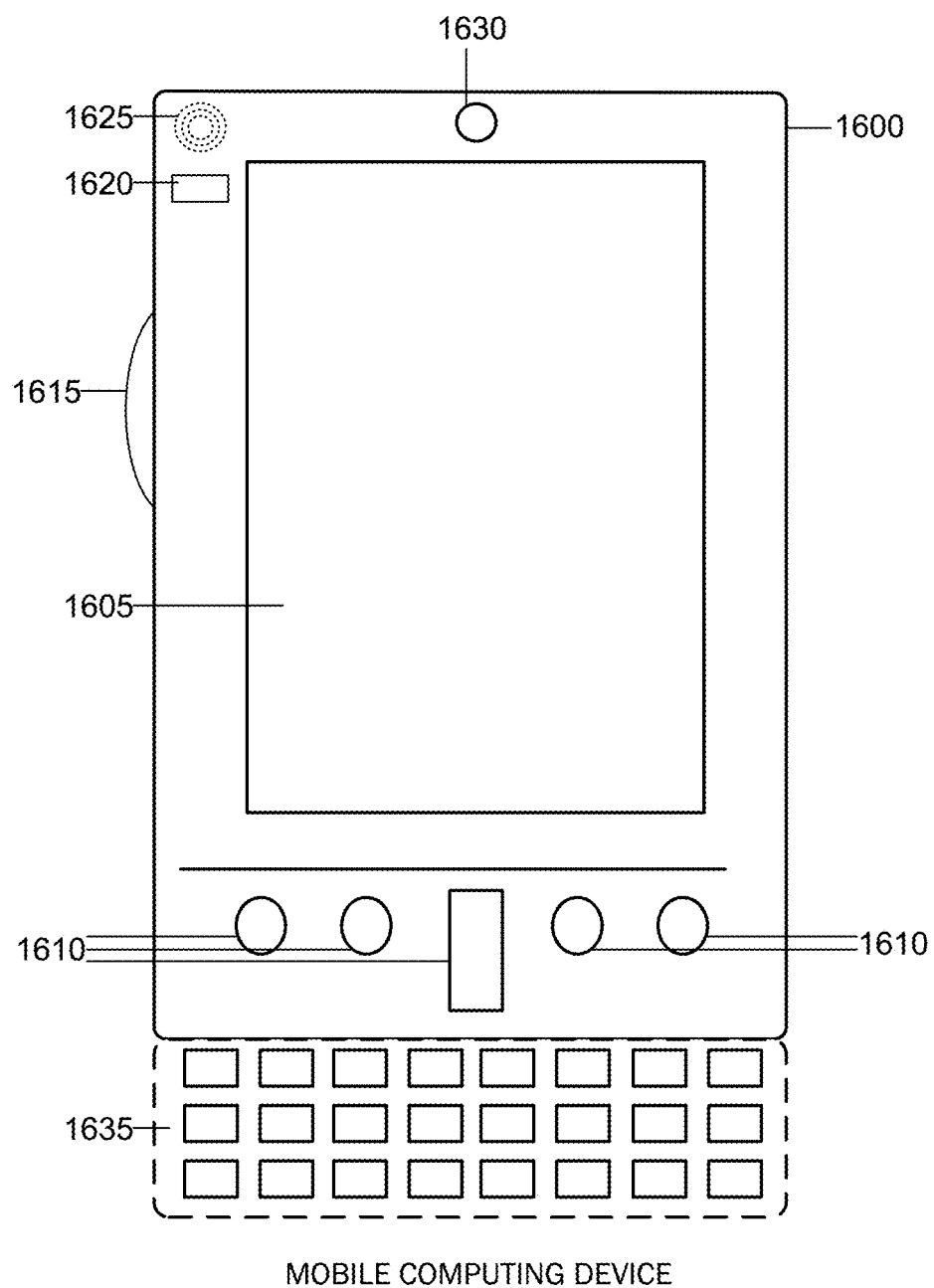
FIGS. 16A and 16B are simplified block diagrams of a mobile computing device with which embodiments of the present invention may be practiced.
Figure 16B:
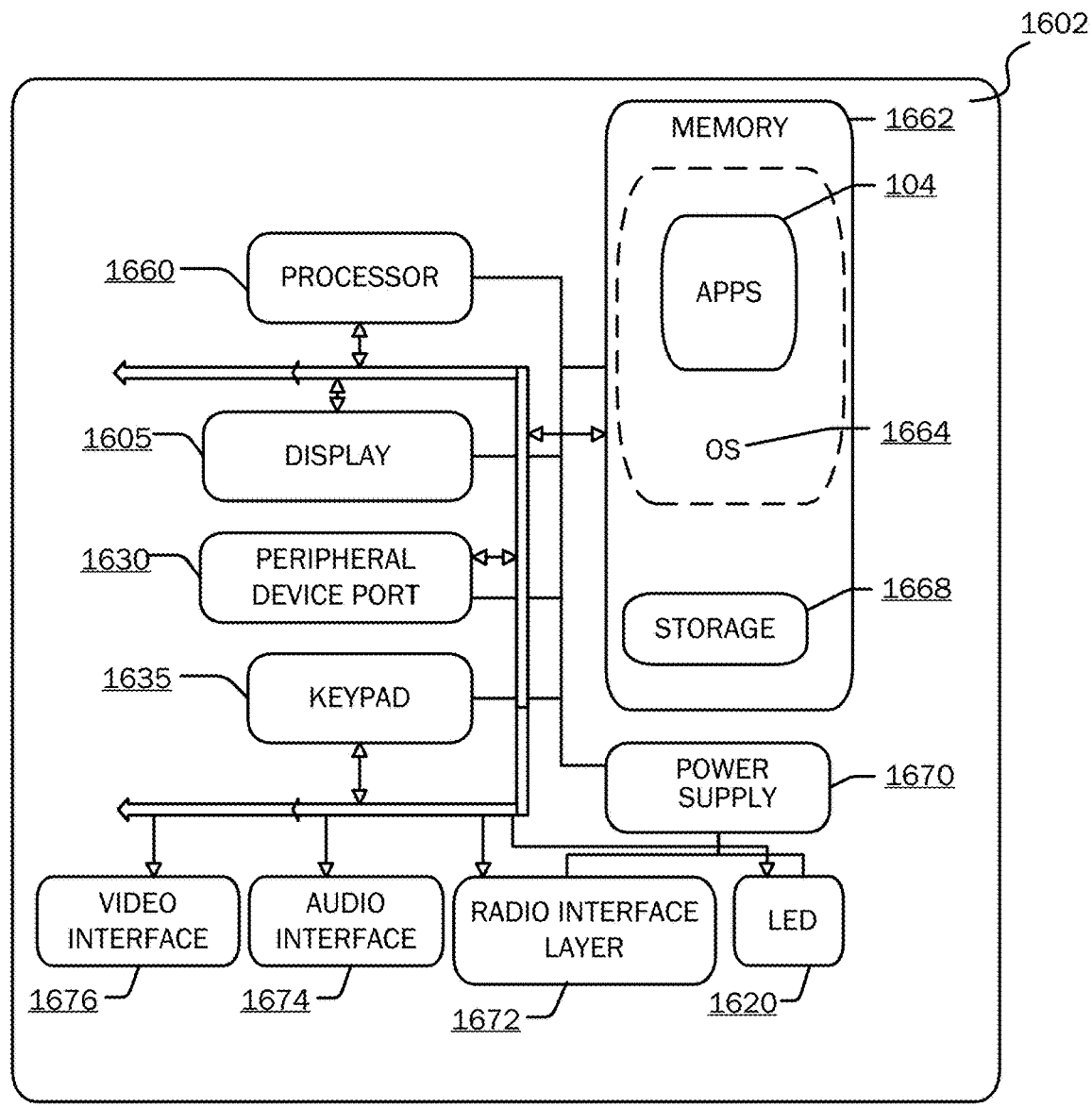
Figure 17:
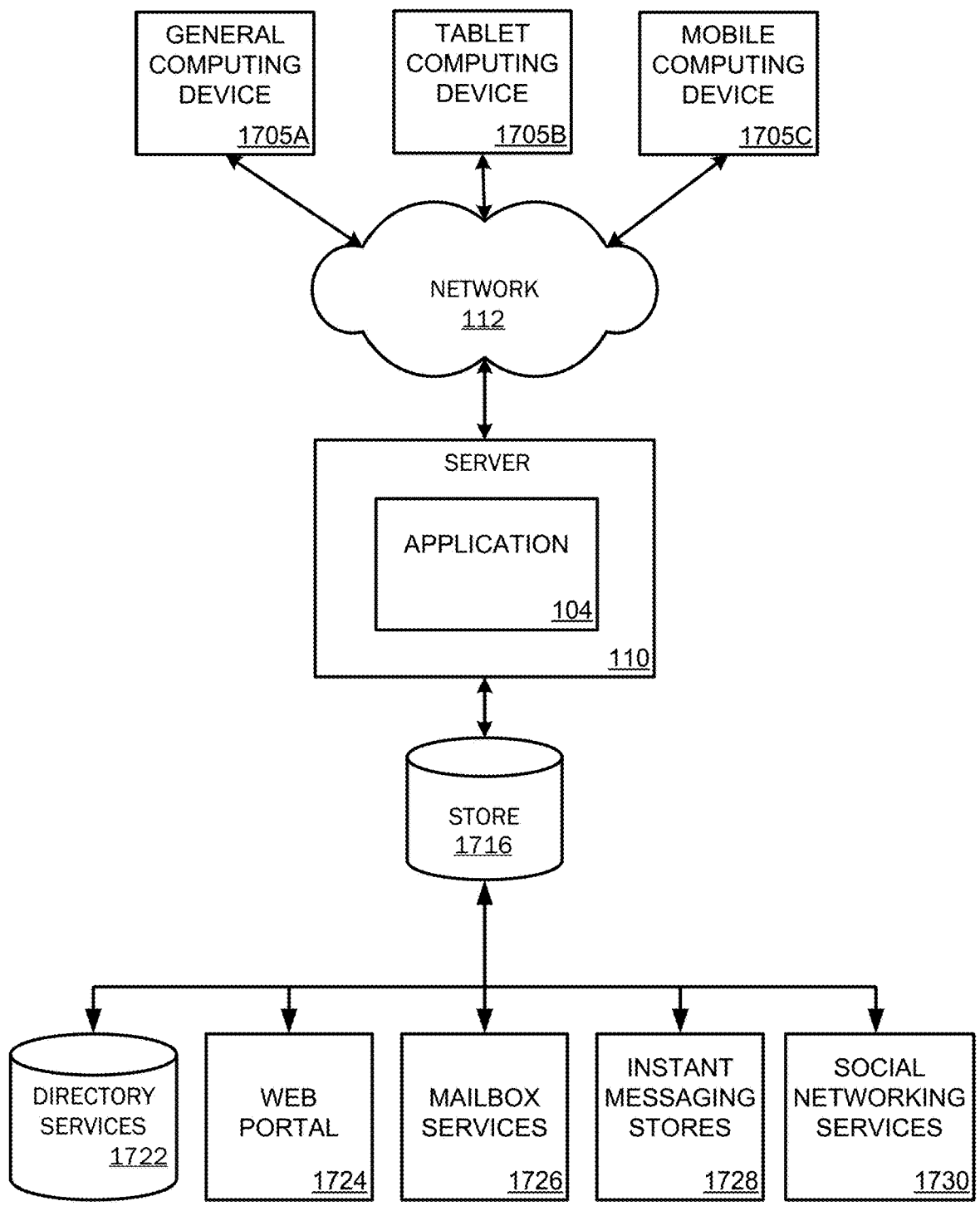
FIG. 17 is a simplified block diagram of a distributed computing system in which embodiments of the present invention may be practiced.

FIGS. 15-17 and the associated descriptions provide a discussion of a variety of operating environments in which embodiments of the invention may be practiced. However, the devices and systems illustrated and discussed with respect to FIGS. 15-17 are for purposes of example and illustration and are not limiting of a vast number of computing device configurations that may be utilized for practicing embodiments of the invention, described herein.

FIG. 15 is a block diagram illustrating physical components (i.e., hardware) of a computing device 1500 with which embodiments of the invention may be practiced. The computing device components described below may be suitable for the computing devices described above including the personal computer 102a, the tablet computer 102b, and the smart phone 102c. In a basic configuration, the computing device 1500 may include at least one processing unit 1502 and a system memory 1504. Depending on the configuration and type of computing device, the system memory 1504 may comprise, but is not limited to, volatile storage (e.g., random access memory), non-volatile storage (e.g., read-only memory), flash memory, or any combination of such memories. The system memory 1504 may include an operating system 1505 and one or more program modules 1506 suitable for running software applications 104 such as the spreadsheet application. The operating system 1505, for example, may be suitable for controlling the operation of the computing device 1500. Furthermore, embodiments of the invention may be practiced in conjunction with a graphics library, other operating systems, or any other application program and is not limited to any particular application or system. This basic configuration is illustrated in FIG. 15 by those components within a dashed line 1508. The computing device 1500 may have additional features or functionality. For example, the computing device 1500 may also include additional data storage devices (removable and/or non-removable) such as, for example, magnetic disks, optical disks, or tape. Such additional storage is illustrated in FIG. 15 by a removable storage device 1509 and a non-removable storage device 1510.

As stated above, a number of program modules and data files may be stored in the system memory 1504. While executing on the processing unit 1502, the software applications 104 may perform processes including, but not limited to, one or more of the stages of the method 1400 illustrated in FIG. 14. Other program modules that may be used in accordance with embodiments of the present invention may include electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 15 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the software applications 104 may be operated via application-specific logic integrated with other components of the computing device 1500 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 1500 may also have one or more input device(s) 1512 such as a keyboard, a mouse, a pen, a sound input device, a touch input device, etc. The output device(s) 1514 such as a display, speakers, a printer, etc. may also be included. The aforementioned devices are examples and others may be used. The computing device 1500 may include one or more communication connections 1516 allowing communications with other computing devices 1518. Examples of suitable communication connections 1516 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1504, the removable storage device 1509, and the non-removable storage device 1510 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1500. Any such computer storage media may be part of the computing device 1500.

FIGS. 16A and 16B illustrate a mobile computing device 1600, for example, a mobile telephone, a smart phone, a tablet personal computer, a laptop computer, and the like, with which embodiments of the invention may be practiced. With reference to FIG. 16A, one embodiment of a mobile computing device 1600 for implementing the embodiments is illustrated. In a basic configuration, the mobile computing device 1600 is a handheld computer having both input elements and output elements. The mobile computing device 1600 typically includes a display 1605 and one or more input buttons 1610 that allow the user to enter information into the mobile computing device 1600. The display 1605 of the mobile computing device 1600 may also function as an input device (e.g., a touch screen display 116). If included, an optional side input element 1615 allows further user input. The side input element 1615 may be a rotary switch, a button, or any other type of manual input element. In alternative embodiments, mobile computing device 1600 may incorporate more or less input elements. For example, the display 1605 may not be a touch screen in some embodiments. In yet another alternative embodiment, the mobile computing device 1600 is a portable phone system, such as a cellular phone. The mobile computing device 1600 may also include an optional keypad 1635. Optional keypad 1635 may be a physical keypad or a "soft" keypad generated on the touch screen display. In various embodiments, the output elements include the display 1605 for showing a graphical user interface (GUI), a visual indicator 1620 (e.g., a light emitting diode), and/or an audio transducer 1625 (e.g., a speaker). In some embodiments, the mobile computing device 1600 incorporates a vibration transducer for providing the user with tactile feedback. In yet another embodiment, the mobile computing device 1600 incorporates input and/or output ports, such as an audio input (e.g., a microphone jack), an audio output (e.g., a headphone jack), and a video output (e.g., a HDMI port) for sending signals to or receiving signals from an external device.

FIG. 16B is a block diagram illustrating the architecture of one embodiment of a mobile computing device. That is, the mobile computing device 1600 can incorporate a system (i.e., an architecture) 1602 to implement some embodiments. In one embodiment, the system 1602 is implemented as a "smart phone" capable of running one or more applications (e.g., browser, e-mail, calendaring, contact managers, messaging clients, games, and media clients/players). In some embodiments, the system 1602 is integrated as a computing device, such as an integrated personal digital assistant (PDA) and wireless phone.

One or more application programs 104 may be loaded into the memory 1662 and run on or in association with the operating system 1664. Examples of the application programs include phone dialer programs, e-mail programs, personal information management (PIM) programs, word processing programs, spreadsheet programs, Internet browser programs, messaging programs, and so forth. The system 1602 also includes a non-volatile storage area 1668 within the memory 1662. The non-volatile storage area 1668 may be used to store persistent information that should not be lost if the system 1602 is powered down. The application programs 104 may use and store information in the non-volatile storage area 1668, such as e-mail or other messages used by an e-mail application, and the like. A synchronization application (not shown) also resides on the system 1602 and is programmed to interact with a corresponding synchronization application resident on a host computer to keep the information stored in the non-volatile storage area 1668 synchronized with corresponding information stored at the host computer. As should be appreciated, other applications may be loaded into the memory 1662 and run on the mobile computing device 1600, including software applications 1520 described herein.

The system 1602 has a power supply 1670, which may be implemented as one or more batteries. The power supply 1670 might further include an external power source, such as an AC adapter or a powered docking cradle that supplements or recharges the batteries.

The system 1602 may also include a radio 1672 that performs the function of transmitting and receiving radio frequency communications. The radio 1672 facilitates wireless connectivity between the system 1602 and the "outside world," via a communications carrier or service provider. Transmissions to and from the radio 1672 are conducted under control of the operating system 1664. In other words, communications received by the radio 1672 may be disseminated to the application programs 104 via the operating system 1664, and vice versa.

The visual indicator 1620 may be used to provide visual notifications, and/or an audio interface 1674 may be used for producing audible notifications via the audio transducer 1625. In the illustrated embodiment, the visual indicator 1620 is a light emitting diode (LED) and the audio transducer 1625 is a speaker. These devices may be directly coupled to the power supply 1670 so that when activated, they remain on for a duration dictated by the notification mechanism even though the processor 1660 and other components might shut down for conserving battery power. The LED may be programmed to remain on indefinitely until the user takes action to indicate the powered-on status of the device. The audio interface 1674 is used to provide audible signals to and receive audible signals from the user. For example, in addition to being coupled to the audio transducer 1625, the audio interface 1674 may also be coupled to a microphone to receive audible input, such as to facilitate a telephone conversation. In accordance with embodiments of the present invention, the microphone may also serve as an audio sensor to facilitate control of notifications, as will be described below. The system 1602 may further include a video interface 1676 that enables an operation of an on-board camera 1630 to record still images, video stream, and the like.

A mobile computing device 1600 implementing the system 1602 may have additional features or functionality. For example, the mobile computing device 1600 may also include additional data storage devices (removable and/or non-removable) such as, magnetic disks, optical disks, or tape. Such additional storage is illustrated in FIG. 16B by the non-volatile storage area 1668.

Data/information generated or captured by the mobile computing device 1600 and stored via the system 1602 may be stored locally on the mobile computing device 1600, as described above, or the data may be stored on any number of storage media that may be accessed by the device via the radio 1672 or via a wired connection between the mobile computing device 1600 and a separate computing device associated with the mobile computing device 1600, for example, a server computer in a distributed computing network, such as the Internet. As should be appreciated such data/information may be accessed via the mobile computing device 1600 via the radio 1672 or via a distributed computing network 112. Similarly, such data/information may be readily transferred between computing devices for storage and use according to well-known data/information transfer and storage means, including electronic mail and collaborative data/information sharing systems.

FIG. 17 illustrates one embodiment of the architecture of a system for providing quick function gesture functionality to one or more client devices, as described above. Content developed, interacted with, or edited in association with an application 104, such as a spreadsheet application, may be stored in different communication channels or other storage types. For example, various documents may be stored using a directory service 1722, a web portal 1724, a mailbox service 1726, an instant messaging store 1728, or a social networking site 1730. The application 104 may use any of these types of systems or the like for enabling data utilization, as described herein. A server 110 may provide the spreadsheet application 104 to clients. As one example, the server 110 may be a web server providing the spreadsheet application 104 over the web. The server 110 may provide the spreadsheet application 104 over the web to clients through a network 112. By way of example, the client computing device may be implemented as the computing device 1500 and embodied in a personal computer 102A, a tablet computer 102B, and/or a mobile computing device 102C (e.g., a smart phone). Any of these embodiments of the client computing device 102A-C may obtain content from the store 1716.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

One skilled in the relevant art may recognize, however, that the embodiments may be practiced without one or more of the specific details, or with other methods, resources, materials, etc. In other instances, well known structures, resources, or operations have not been shown or described in detail merely to avoid obscuring aspects of the embodiments.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

We claim:

1. A computer-implemented method for interacting with an electronic spreadsheet document, comprising:
   receiving a first input to select a first line of cells in a displayed spreadsheet document;
   in response to receiving the first input, causing a selectable control element to be displayed between the first line of cells and an adjacent second line of cells;
   receiving a second input on the selectable control element that slides the selectable control element along a first axis;
   in response to movement of the selectable control element along the first axis, causing one or more new lines of cells to be inserted into the spreadsheet document between the first and the second lines of cells, wherein a number of lines of cells inserted into the spreadsheet document is based on a distance the selectable control element is moved; and
   causing a display of the displayed spreadsheet document to be updated.

2. The method of claim 1, wherein the display of the displayed spreadsheet document is updated as the movement of the selectable control element occurs.

3. The method of claim 1, further comprising receiving a pull-apart gesture on the displayed spreadsheet document for pulling two columns apart to insert one or more additional columns between the two columns, the pull-apart gesture comprising:
   receiving a first selection of a first column;
   receiving a second selection of a second column that is adjacent the first column;
   sliding at least one of the first selection or the second selection along a second axis to pull the first and the second columns apart;
   in response to sliding the at least one of the first selection or the second selection along the second axis, inserting one or more additional columns between the first and the second columns, wherein a number of additional columns inserted into the displayed spreadsheet document is based on a distance between the first and the second columns when pulled apart; and
   causing the display of the displayed spreadsheet document to be updated.

4. The method of claim 1, further comprising receiving a pull-apart gesture on the displayed spreadsheet document for pulling two columns apart to reveal one or more columns hidden from view behind the two columns, the pull-apart gesture comprising:
   receiving a first selection of a first column;
   receiving a second selection of a second column;
   sliding at least one of the first selection or the second selection along a second axis to pull the first and the second columns apart;
   in response to sliding the at least one of the first selection or the second selection along the second axis, revealing one or more columns hidden between the first and the second columns, wherein a number of revealed columns is based on a distance between the first and the second columns when pulled apart; and
   causing the display of the displayed spreadsheet document to be updated.

5. The method of claim 1, further comprising receiving a pull-apart gesture on the displayed spreadsheet document for pulling two rows apart to insert one or more additional rows between the two rows, the pull-apart gesture comprising:
   receiving a first selection of a first row;
   receiving a second selection of a second row that is adjacent the first row;
   sliding at least one of the first selection or the second selection along a second axis to pull the first and the second rows apart;

in response to sliding the at least one of the first selection or the second selection along the second axis, inserting one or more additional rows between the first and the second rows, wherein a number of additional rows inserted into the displayed spreadsheet document is based on a distance between the first and the second rows when pulled apart; and causing the display of the displayed spreadsheet document to be updated.

6. The method of claim 1, further comprising receiving a tear-and-pull gesture on the displayed spreadsheet document, the tear-and-pull gesture comprising:

receiving a multi-touch input on the displayed spreadsheet document to select one or more cells;

receiving a pulling gesture that moves the multi-touch input over a portion of the displayed spreadsheet document to tear data in the one or more cells out of the displayed spreadsheet document; and displaying the data that is torn out of the displayed spreadsheet document in a canvas separate from the displayed spreadsheet document.

7. The method of claim 1, further comprising receiving a drag-and-drop away gesture on the displayed spreadsheet document to delete a column from the displayed spreadsheet document, the drag-and drop away gesture comprising:

receiving a selection of a column and dragging the column along a second axis in an upwards or downwards direction and away from the displayed spreadsheet document;

when the column has been dragged a given distance, deleting the column from the displayed spreadsheet document; and causing the display of the displayed spreadsheet document to be updated.

8. The method of claim 1, further comprising receiving a touch-hold-pull gesture on the displayed spreadsheet document to reveal one or more columns hidden from view behind two adjacent columns in the displayed spreadsheet document, the touch-hold-pull gesture comprising:

receiving a first selection of a first column;

receiving a second selection of a second column;

sliding the second selection along a second axis away from the first selection;

in response to sliding the second selection along the second axis, revealing one or more columns hidden from view behind the first and the second columns, wherein a number of revealed columns is based on a distance the second selection is slid along the second axis; and causing the display of the displayed spreadsheet document to be updated.

9. The method of claim 1, further comprising receiving a push-together gesture on the displayed spreadsheet document to hide one or more columns behind two pushed-together columns, the push-together gesture comprising:

receiving a first selection of a first column;

receiving a second selection of a second column;

pushing at least one of the first or the second selections along a second axis until the first and the second columns are adjacent each other;

in response to pushing the at least one of the first or the second selections, hiding one or more columns behind the first and the second columns, wherein a number of columns hidden behind the first and the second columns is based on a number of columns between the first column and the second column when the first and the second columns are selected; and causing the display of the displayed spreadsheet document to be updated.

10. The method of claim 1, further comprising receiving a push-together gesture on the displayed spreadsheet document to hide one or more rows behind two pushed-together rows, the push-together gesture comprising:

receiving a first selection of a first row;

receiving a second selection of a second row;

pushing at least one of the first or the second selections along a second axis until the first and the second rows are adjacent each other;

in response to pushing the at least one of the first or the second selections, hiding one or more rows behind the first and the second rows, wherein a number of rows hidden behind the first and the second rows is based on a number of rows between the first row and the second row when the first and the second rows are selected; and causing the display of the displayed spreadsheet document to be updated.

11. The method of claim 1, further comprising receiving a drag-and-drop between gesture on the displayed spreadsheet document to move a column from a first location in the displayed spreadsheet document to a second location in the displayed spreadsheet document, the drag-and-drop between gesture comprising:

receiving a selection of a column header and dragging the column header from the first location to the second location;

in response to dragging the column header, moving the column to the second location; and causing the display of the displayed spreadsheet document to be updated.

12. The method of claim 1, wherein:

the displayed spreadsheet document comprises two or more sheets; and the method further comprises receiving a multi-touch swipe gesture on the displayed spreadsheet document to navigate between a first sheet and a second sheet in the two or more sheets, the multi-touch swipe gesture comprising:

receiving multiple selections on the first sheet in the displayed spreadsheet document;

moving the multiple selections along a second axis to navigate from the first sheet to the second sheet; and causing the display of the displayed spreadsheet document to be updated by displaying the second sheet.

13. The method of claim 1, further comprising receiving a touch-and-throw gesture on the displayed spreadsheet document to extend a selection, the touch-and-throw gesture comprising:

receiving a selection of a first cell;

causing a selection handle to be displayed around the first cell;

receiving a selection of the selection handle and movement of the selection handle to a second cell;

in response to the movement of the selection handle to the second cell, displaying the selection handle around both the first and the second cells to extend the selection of the first cell to include a selection of the second cell; and causing the display of the displayed spreadsheet document to be updated.

14. The method of claim 1, further comprising receiving a touch-and-pull gesture on a column header for automatically sorting one or more data items contained in a column associated with the column header, the touch-and-pull gesture comprising:
    receiving a selection of the column header;
    moving the selection along a second axis and displaying a visual indicator that indicates a given distance in which the selection is to be moved to invoke a sorting operation and displaying a user interface element that indicates a sort operation to be performed;
    when the selection is moved the given distance, sorting the one or more data items contained in the column according to the sort operation; and
    causing the display of the displayed spreadsheet document to be updated.

15. The method of claim 1, further comprising receiving a pinch-and-turn gesture on the displayed spreadsheet document to rotate an element displayed in the displayed spreadsheet document, the pinch-and-turn gesture comprising:
    receiving a selection of the element;
    receiving a circular motion on the element to rotate the element in a direction that corresponds to a direction of the circular motion; and
    in response to receiving the circular motion, causing the display of the displayed spreadsheet document to be updated by displaying the element as rotated.

16. A non-transitory computer readable medium on which is stored computer executable instructions, that when executed by a processor, cause operations to be performed, the operations comprising:
    receiving a first input to select a first line of cells in a displayed spreadsheet document;
    in response to receiving the first input, displaying a selectable control element;
    receiving a second input on the selectable control element that slides the selectable control element along an axis;
    in response to sliding the selectable control element along the axis, inserting a new second line of cells into the displayed spreadsheet document, the new second line of cells positioned adjacent the first line of cells;
    updating a display of the displayed spreadsheet document;
    receiving a second input to select a third line of cells and a third input to select a fourth line of cells positioned adjacent the third line of cells in the displayed spreadsheet document;
    detecting movement of at least one of the second input or the third input to pull apart the third and the fourth lines of cells;
    in response to detecting the movement, inserting a new fifth line of cells into the displayed spreadsheet document between the third line of cells and the fourth line of cells; and
    updating the display of the displayed spreadsheet document.

17. The non-transitory computer readable medium of claim 16, wherein:
    the display of the displayed spreadsheet document is updated as the selectable control element slides along the axis; and
    the display of the displayed spreadsheet document is updated as the second and the third inputs are pulled apart.

18. A system, comprising:
    one or more processors; and
    a memory coupled to the one or more processors and storing instructions, that when executed by the one or more processors, cause operations comprising:
    receiving a first input to select a first line of cells in a displayed spreadsheet document;
    in response to receiving the first input, causing a selectable control element to be displayed between the first line of cells and an adjacent second line of cells;
    receiving a second input on the selectable control element that slides the selectable control element along a first axis;
    in response to sliding the selectable control element along the first axis, causing one or more new lines of cells to be inserted into the spreadsheet document between the first and the second lines of cells, wherein a number of lines of cells inserted into the spreadsheet document is based on a distance the selectable control element is moved; and
    causing a display of the displayed spreadsheet document to be updated.

19. The system of claim 18, wherein the memory stores further instructions for:
    receiving a third input to select a third line of cells and a fourth input to select a fourth line of cells positioned adjacent the third line of cells in the displayed spreadsheet document;
    detecting movement of at least one of the third input or the fourth input to pull apart the third and the fourth lines of cells;
    in response to detecting the movement, inserting one or more new lines of cells into the displayed spreadsheet document between the third line of cells and the fourth line of cells, wherein a number of new lines of cells inserted into the displayed spreadsheet document is based on a distance between the third and the fourth lines of cells when pulled apart; and
    updating the display of the displayed spreadsheet document.

20. The system of claim 18, wherein the memory stores further instructions for:
    receiving a selection of a column header of a column in the displayed spreadsheet document;
    moving the selection along a second axis and displaying a visual indicator that indicates a given distance in which the selection is to be moved to invoke a sorting operation and displaying a user interface element that indicates a sort operation to be performed;
    when the selection is moved the given distance, sorting the one or more data items contained in the column according to the sort operation; and
    causing the display of the displayed spreadsheet document to be updated.

* * * * *